(12) United States Patent
Seol et al.

(10) Patent No.: US 9,288,091 B2
(45) Date of Patent: Mar. 15, 2016

(54) MODULATION METHOD AND APPARATUS WITH CONSIDERATION OF ADAPTIVE HYBRID AUTOMATIC REPEAT REQUEST IN WIRELESS COMMUNICATION SYSTEM

(71) Applicant: Samsung Electronics Co., Ltd., Suwon-si, Gyeonggi-do (KR)

(72) Inventors: Ji-Yun Seol, Seongnam-si (KR); Tae-Young Kim, Seongnam-si (KR); Won-Il Roh, Yongin-si (KR); Jeong-Ho Park, Seoul (KR); Min Sagong, Suwon-si (KR); Hyun-Kyu Yu, Yongin-si (KR); Kyung-Whoon Cheun, Seoul (KR); Jae-Weon Cho, Seongnam-si (KR); Sung-Nam Hong, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 14/139,107

(22) Filed: Dec. 23, 2013

(65) Prior Publication Data

US 2014/0177687 A1 Jun. 26, 2014

(30) Foreign Application Priority Data

Dec. 21, 2012 (KR) .................. 10-2012-0150904

(51) Int. Cl.
*H03K 7/06* (2006.01)
*H03K 9/06* (2006.01)
*H04L 27/00* (2006.01)
(Continued)

(52) U.S. Cl.
CPC .............. *H04L 27/0008* (2013.01); *H04L 1/18* (2013.01); *H04L 1/1819* (2013.01); *H04L 5/00* (2013.01); *H04L 27/36* (2013.01); *Y02B 60/50* (2013.01)

(58) Field of Classification Search
CPC ..... H04L 27/0004; H04L 27/10; H04L 27/18; H04L 27/0008; H04L 27/36; H04L 1/18; H04L 5/00; H04L 1/1819; H03B 21/00; H03C 3/00
See application file for complete search history.

(56) References Cited

U.S. PATENT DOCUMENTS

2006/0115014 A1  6/2006  Jeong et al.
2009/0060094 A1  3/2009  Jung et al.
(Continued)

FOREIGN PATENT DOCUMENTS

WO  2008-133437 A1  11/2008

OTHER PUBLICATIONS

Altunbas et al., "Multilevel Coded FSK/PSK Modulation", 1994, pp. 640-644, Istanbul, Turkey.
(Continued)

*Primary Examiner* — Ted Wang
(74) *Attorney, Agent, or Firm* — Jefferson IP Law, LLP

(57) ABSTRACT

A modulation method and an apparatus with consideration of adaptive Hybrid Automatic Repeat reQuest (HARQ) in a wireless communication system are provided. The method of a transmission end supporting a hybrid modulation technique in which different types of modulation schemes are mixed, information of a channel state with a reception end is collected. A modulation order of a first type of a modulation scheme and a modulation order of a second type of a modulation scheme are determined. The modulation order of a first type of a modulation scheme and a modulation order of a second type of a modulation scheme form the hybrid modulation technique.

12 Claims, 13 Drawing Sheets

(51) Int. Cl.
  *H04L 1/18* (2006.01)
  *H04L 5/00* (2006.01)
  *H04L 27/36* (2006.01)

(56) References Cited

U.S. PATENT DOCUMENTS

| | | | |
|---|---|---|---|
| 2012/0027065 A1 | 2/2012 | Ray et al. | |
| 2012/0155415 A1* | 6/2012 | Seok | 370/329 |
| 2012/0163444 A1 | 6/2012 | Oh et al. | |
| 2014/0362804 A1* | 12/2014 | Han | H04L 5/0053 370/329 |

OTHER PUBLICATIONS

Digham et al., "Adaptive Hybrid M-FSK M-QAM Modulation", 2003, pp. 964-967, Minneapolis, USA.

Latif et al., "Performance of Hybrid MQAM-LFSK (HQFM) OFDM Transceiver in Rayleigh Fading Channels", 2006, pp. 52-55, Rawalpindi, Pakistan.

Latif, "Hybrid QAM-FSK (HQFM) OFDM Transceiver with Low PAPR", Jan. 2009, pp. 1-177, Pakistan.

Latif Asma & Gohar Nasir D., "Error rate performance of Hybrid QAM-FSK in OFDM systems exhibiting low PAPR", Science in China Series F: Information Sciences, vol. 52, No. 10, Oct. 2009, pp. 1875-1880.

* cited by examiner

MODULATION METHOD AND APPARATUS WITH CONSIDERATION OF ADAPTIVE HYBRID AUTOMATIC REPEAT REQUEST IN WIRELESS COMMUNICATION SYSTEM

CROSS-REFERENCE TO RELATED APPLICATION(S)

This application claims the benefit under 35 U.S.C. §119 (a) of a Korean patent application filed on Dec. 21, 2012 in the Korean Intellectual Property Office and assigned Serial number 10-2012-0150904, the entire disclosure of which is hereby incorporated by reference.

TECHNICAL FIELD

The present disclosure relates to a modulation scheme in a wireless communication system. More particularly, the present disclosure relates to a modulation method and an apparatus with consideration of an adaptive Hybrid Automatic Repeat reQuest (HARD).

BACKGROUND

Recently, to meet a constantly increasing wireless data traffic demand, a wireless communication system evolves in a direction for supporting a higher data transmission rate. For example, to increase a data transmission rate in a wireless communication system, a study for improving spectral efficiency and increasing a channel capacity is in active progress based on a communication technology such as Orthogonal Frequency Division Multiple Access (OFDMA), Multiple Input Multiple Output (MIMO) transmission/reception, and the like.

Particularly, in a wireless mobile communication system, a study for improving a transmission efficiency of cell-edge users which is deteriorated due to a low Signal-to-Noise Ratio (SNR) at a cell edge or a low Carrier-to-Interference and Noise Ratio (CINR) by an interference of a neighbor base station is in progress. For example, techniques for improving a transmission efficiency of a cell-edge user such as Inter-Cell Interference-Coordination (ICIC), Coordinated Multi-Points (CoMP), interference cancellation of a reception end, and the like, are studied and proposed.

However, the above identified techniques for improving a transmission efficiency of a cell-edge user have been studied in an aspect of an interference control at a transmission end or interference cancellation at a reception end. More essentially, a technology for maximally improving a channel capacity of a user of a cell edge region needs to be studied. For example, a technique for maximally improving a channel capacity of a user of a cell edge region needs to be proposed in aspects of channel coding and modulation/demodulation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hybrid modulation technique in which different types of modulation schemes are mixed in a wireless communication system.

Another aspect of the present disclosure is to provide a Hybrid Frequency Shift Keying (FSK) and Quadrature-Amplitude Modulation (QAM) (FQAM) modulation method and an apparatus that combine a bandwidth-efficient QAM modulation scheme and a power-efficient FSK modulation scheme, and operate the same in a wireless communication system.

Another aspect of the present disclosure is to provide a method and an apparatus for determining a modulation order of FQAM with consideration of a channel state in a wireless communication system.

Another aspect of the present disclosure is to provide a method and an apparatus for determining a modulation order of QAM and a modulation order of FSK forming FQAM with consideration of a channel state in a wireless communication system.

Another aspect of the present disclosure is to provide a method and an apparatus for changing a modulation order of QAM and a modulation order of FSK forming FQAM with consideration of retransmission in a wireless communication system supporting a Hybrid Automatic Repeat reQuest (HARQ).

Another aspect of the present disclosure is to provide a method and an apparatus for fixedly operating or flexibly changing and operating a modulation order of FQAM depending on a coding scheme in a wireless communication system supporting an HARQ.

Another aspect of the present disclosure is to provide a method and an apparatus for allowing a base station to transmit a modulation order of FQAM for uplink and/or downlink retransmission, and resource allocation information to a terminal via a MAP message or a control signal (e.g., a Physical Downlink Control Channel (PDCCH) signal) in a wireless communication system supporting an HARQ.

Another aspect of the present disclosure is to provide a method and an apparatus for allowing a base station and a terminal to promise a modulation order of FQAM for uplink and/or downlink retransmission and a resource allocation change rule in advance, and perform retransmission according to the modulation order of the FQAM and the resource allocation change rule promised in advance in a wireless communication system supporting an HARQ.

In accordance with an aspect of the present disclosure, a method of a transmission end supporting a hybrid modulation technique in which different types of modulation schemes are mixed is provided. The method includes collecting information of a channel state with a reception end, and determining a modulation order of a first type of a modulation scheme and a modulation order of a second type of a modulation scheme. The first type of the modulation scheme and the second type of the modulation scheme form the hybrid modulation technique.

In accordance with another aspect of the present disclosure, a method of a reception end supporting a hybrid modulation technique in which different types of modulation schemes are mixed is provided. The method includes collecting information of a channel state with a transmission end, determining at least one of an entire modulation order of the hybrid modulation technique, a modulation order of a first type of a modulation scheme and a modulation order of a second type of a modulation scheme, and operating a demodulation scheme corresponding to the hybrid modulation technique based on the determined modulation order. The first type of the modulation scheme and the second type of the modulation scheme form the hybrid modulation technique.

In accordance with further another aspect of the present disclosure, an apparatus of a transmission end supporting a hybrid modulation technique in which different types of modulation schemes are mixed is provided. The apparatus includes a hybrid modulator configured to combine a first type of a modulation scheme and a second type of a modulation scheme and to operate the combined modulation scheme, and a scheduler configured to collect information of a channel state with a reception end, and to determine a modulation order of the first type of the modulation scheme and a modulation order of the second type of the modulation scheme depending on the channel state information.

In accordance with yet further another aspect of the present disclosure, an apparatus of a reception end supporting a hybrid modulation technique in which different types of modulation schemes are mixed is provided. The apparatus includes a scheduler configured to collect information of a channel state with a transmission end, and to determine at least one of an entire modulation order of the hybrid modulation technique, a modulation order of a first type of a modulation scheme and a modulation order of a second type of a modulation scheme, and a hybrid demodulator configured to operate a demodulation scheme corresponding to the hybrid modulation technique based on the determined modulation order. The first type of the modulation scheme and the second type of the modulation scheme form the hybrid modulation technique.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
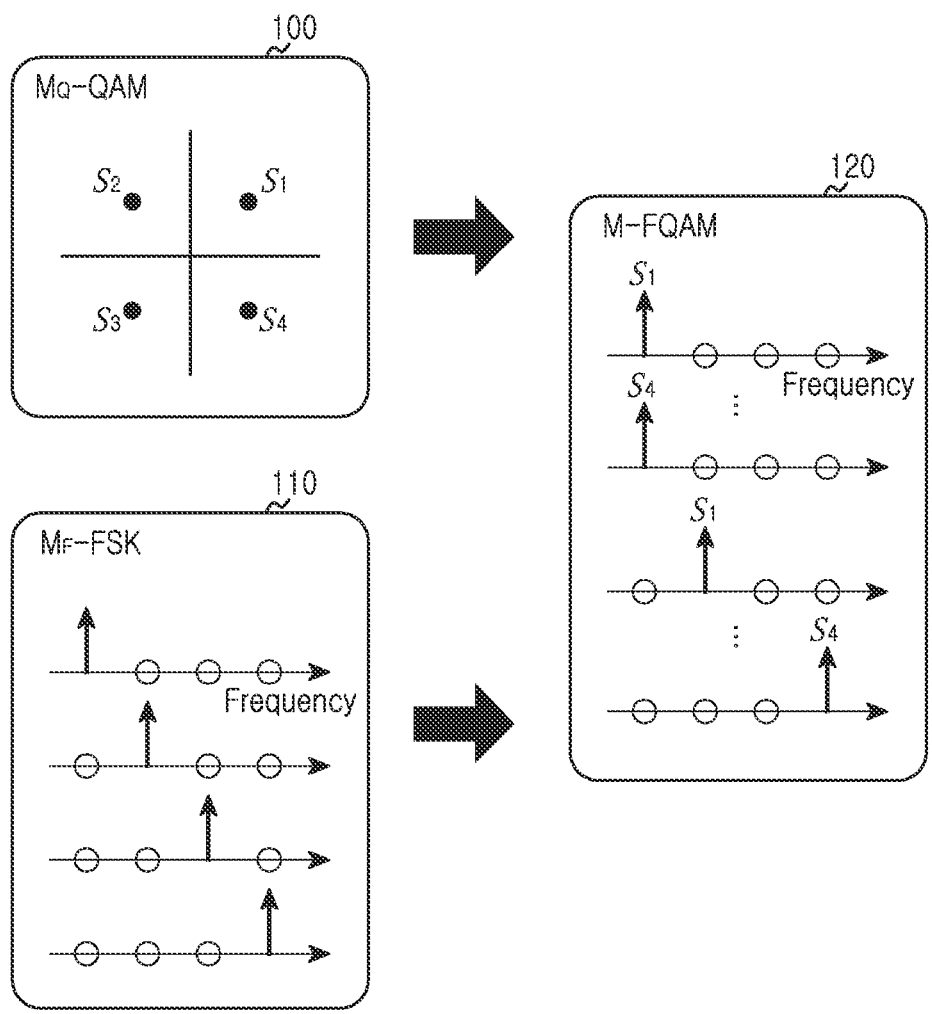
FIG. 1 is a view illustrating a hybrid Frequency Shift Keying (FSK) Quadrature Amplitude Modulation (QAM) (FQAM) modulation scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a technology for operating a hybrid modulation technique by which different types of modulation schemes are mixed is described. According to various embodiments of the present disclosure, the types of the modulation schemes may be classified into a Frequency Shift Keying (FSK) type, a Phase Shift Keying (PSK) type, an Amplitude Shift Keying (ASK) type, a Quadrature-Amplitude Modulation (QAM) type, and the like. However, the modulation scheme according to various embodiments of the present disclosure is not limited to the above-mentioned types. A hybrid modulation technique according to various embodiments of the present disclosure may be a technique in which FSK and QAM have been mixed, and may be a technique in which PSK and ASK have been mixed, and may be a technique in which FSK and PSK have been mixed.

In addition, although description below is made using a case of operating a hybrid modulation technique in which two different types of modulation schemes have been mixed as an example, various embodiments of the present disclosure described below are equally applicable to even a case of operating a hybrid modulation scheme in which two or more different types of modulation schemes have been mixed. For example, various embodiments of the present disclosure are equally applicable to even a case of a hybrid modulation technique in which FSK, ASK, and QAM have been mixed, or a hybrid modulation technique in which ASK, PSK, and QAM have been mixed.

In the following description, a technology for combining (or mixing or coupling) a bandwidth-efficient QAM and a power-efficient FSK and operating a hybrid FSK and QAM Modulation (FQAM) or a Hybrid QAM and FSK Modulation (HQFM) in a wireless communication system is described according to various embodiments of the present disclosure. Hereinafter, to improve a channel capacity depending on a channel state and whether to retransmit a Hybrid Automatic Repeat reQuest (HARQ), various embodiments of the present disclosure use an FQAM modulation scheme in which a QAM modulation scheme and an FSK modulation scheme are combined.

Figure 2:
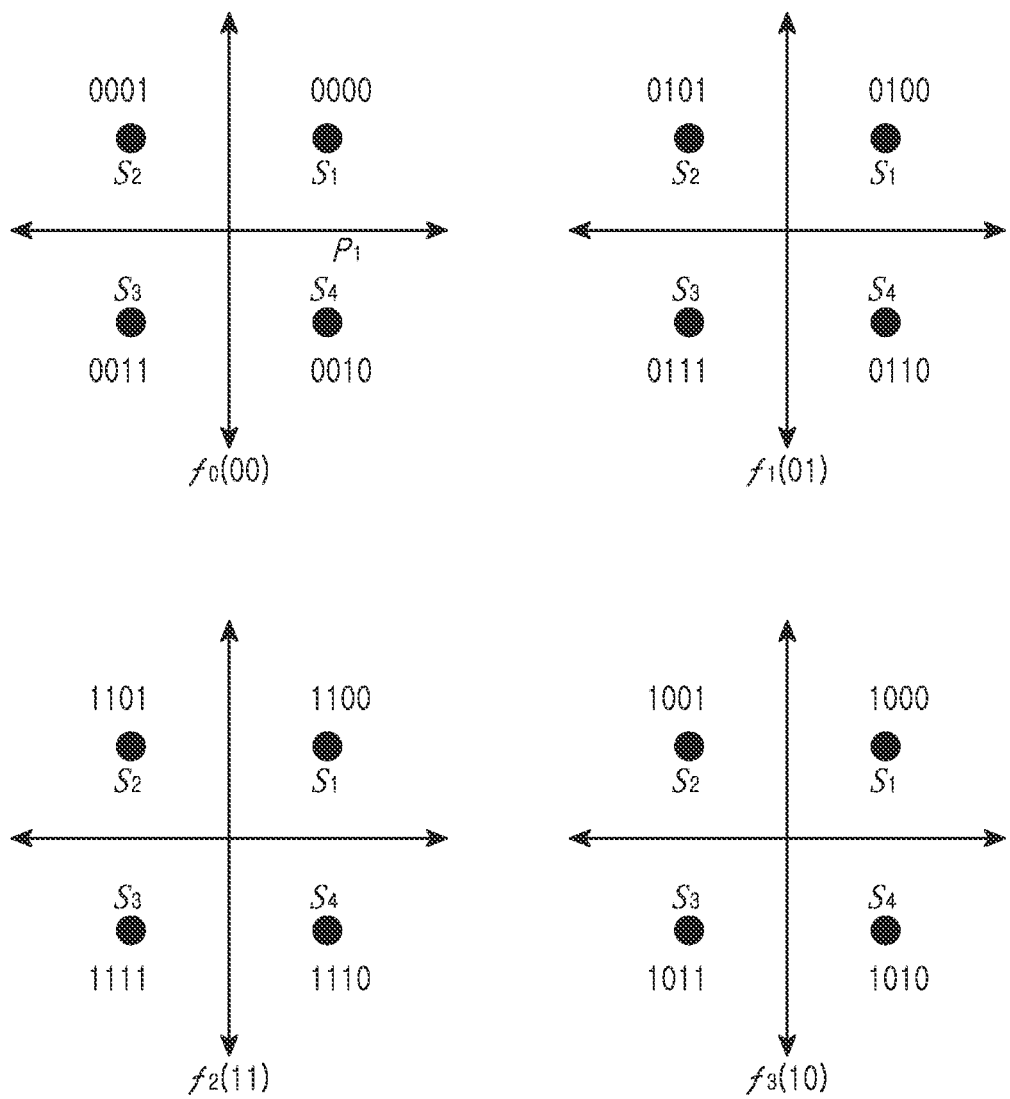
FIG. 2 is a view illustrating an example of mapping a bit to a symbol when operating an FQAM modulation scheme according to an embodiment of the present disclosure.

FIG. 1 is a view illustrating an FQAM modulation scheme according to an embodiment of the present disclosure. FIG. 2 is a view illustrating an example of mapping a bit to a symbol when operating an FQAM modulation scheme according to an embodiment of the present disclosure.

Referring to FIG. 1, an M-FQAM modulation scheme 120 according to various embodiments of the present disclosure is configured to operate by combining an $M_Q$-QAM modulation scheme 100 and an $M_F$-FSK modulation scheme 110 and to map a bit string to modulate to $M_Q$ constellation points of QAM and $M_F$ tones of FSK. In other words, when performing modulation on a $K=\log_2(M)$-bit basis in an Orthogonal Frequency Division Multiple Access (OFDMA), the M-FQAM modulation scheme is configured to map a portion ($=\log_2(M_F)$) of K bits to modulate to one of $M_F$ subcarriers, and map the rest of bits ($=\log_2(M_Q)$) among the K bits to modulate to one of $M_Q$ constellation points using the $M_Q$-QAM modulation scheme 100 and the $M_F$-FSK modulation scheme 110.

Referring to FIG. 2, when modulating an information bit of a 4-bit length using a 16-FQAM modulator in which a 4-FSK and a 4-QAM are combined, the 16-FQAM modulator maps upper 2 bits to one of four FSK tones, and maps lower 2 bits to one of four constellation points, thereby mapping the information bit of the 4-bit length to an FSK tone and a constellation point. For example, as illustrated in FIG. 2, when four FSK tones of f0 to f3 are mapped to 00, 01, 11, 10, respectively, and four constellation points of s1 to s4 are mapped to 00, 01, 11, 10, respectively, when an input information bit is 0010, the upper 2 bits of 00 are mapped to f0 of the four FSK tones, and the lower 2 bits of 10 are mapped to a constellation point s4, so that the information bit 0010 is mapped to s4 and modulated such that the information bit is transmitted via f0.

According to various embodiments of the present disclosure, a modulation order M of an M-FQAM is adaptively determined based on a channel state and whether transmission is HARQ initial transmission or retransmission. Particularly, the modulation order M of the M-FQAM may be adaptively changed or may be a fixed value depending on a channel coding technique. For example, in the case in which a transmitter uses a Bit Interleaved Coding Modulation (BICM) technique, the modulation order M of the M-FQAM may be flexibly changed with consideration of a channel state. In contrast, in the case in which a transmitter uses an $M_C$-ary CM technique, the modulation order M of the M-FQAM may be changed to one of the same value as a channel coding order $M_C$ and integer multiple values of $M_C$.

Figure 3:
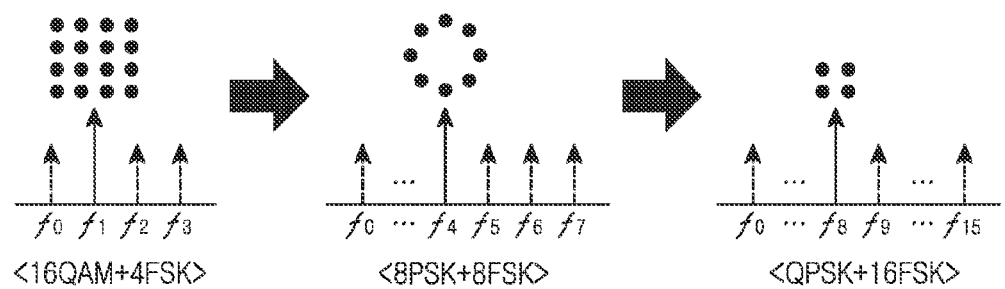
FIG. 3 is a view illustrating an example of adaptively operating FQAM according to an embodiment of the present disclosure.

FIG. 3 is a view illustrating an example of adaptively operating FQAM according to an embodiment of the present disclosure.

Referring to FIG. 3, according to various embodiments of the present disclosure, a modulation order of each of $M_F$-FSK and $M_Q$-QAM may be adaptively selected and changed based on the modulation order M of the M-FQAM. At this point, $M_F$ and $M_Q$ should be changed to values where the product of the two values becomes M ($M=M_F \times M_Q$). For example, as illustrated in FIG. 3, in case of operating a 64-FQAM, the 64-FQAM may include 16 QAM and 4 FSK, include 8PSK and 8 FSK, and include QPSK (4 QAM) and 16 FSK. Particularly, various embodiments of the present disclosure may change a modulation order of each of $M_F$-FSK and $M_Q$-QAM and operate the same with consideration of the number of times of HARQ retransmissions. At this point, the order M of the M-FQAM operating an $M_C$-ary CM technique and a modulation order of $M_C=M$ should be a fixed state while the same HARQ data is transmitted, and $M_F$ and $M_Q$ may be adaptively changed and operated within a condition of maintaining the fixed M. For example, in case of using 64-FQAM during HARQ initial transmission, 64-FQAM should be used even in case of HARQ retransmission of relevant data. In contrast, in case of operating the M-FQAM in combination with a BICM technique, there is no limitation in the order M in HARQ retransmission generally. In case of operating the M-FQAM in combination with an $M_C$-ary CM technique in which $M_C<M$, data encoded using the order $M_C$ of the same $M_C$-ary CM is modulated using an M-ary FQAM and retransmitted. In addition, in the case in which NACK occurs with respect to HARQ transmission, various embodiments of the present disclosure reduce a decoding error for the same Signal-to-Noise Ratio (SNR) in a reception side by increasing the modulation order of a power-efficient $M_F$-FSK, so that HARQ data may be successfully received. Accordingly, as illustrated in FIG. 3, in the case in which 64FQAM in which a 16 QAM and 4 FSK combination is used and NACK occurs with respect to initial transmission, the modulation order of $M_F$-FSK is increased for first retransmission and 64 FQAM in which a 8 PSK and 8 FSK combination may be used. In addition, when NACK occurs with respect to the first transmission, the modulation order of $M_F$-FSK is increased again for second retransmission and 64 FQAM in which a QPSK and 16 FSK combination may be used. Because the order M of the M-FQAM should maintain a fixed state while the same HARQ data is transmitted, the modulation order of the $M_Q$-QAM is reduced as the modulation order of the $M_F$-FSK is increased. However, according to various embodiments of the present disclosure, the modulation order of a bandwidth-efficient $M_Q$-QAM may be increased, and the modulation order of the $M_F$-FSK may be reduced. Additionally, according to various embodiments of the present disclosure, a process of determining the modulation order M of the M-FQAM may be omitted and $M_F$ and $M_Q$ may be determined and the determined $M_F$ and $M_Q$ may be adaptively changed. At this point, $M_F$ and $M_Q$ may preferably be changed such that the product of $M_F$ and $M_Q$ is the same as the product of the previous $M_F$ and $M_Q$. In addition, according to various embodiments of the present disclosure, $M_F$ and $M_Q$ may be maintained without change in case of HARQ retransmission.

As described above, for HARQ retransmission, a wireless communication system according to various embodiments of the present disclosure may adaptively change and operate the modulation orders M, $M_F$, $M_Q$ of the FQAM. For this purpose, according to various embodiments of the present disclosure, for HARQ retransmission, a base station may explicitly provide the modulation order of FQAM to be changed and resource allocation information thereof to a terminal. For example, whenever an uplink and/or downlink HARQ retransmission event occurs, the base station may transmit the modulation order of FQAM to be changed and resource allocation information thereof to the terminal via a MAP message or a control signal (e.g., a Physical Downlink Control Channel (PDCCH) signal). In addition, according to various embodiments of the present disclosure, a base station and a terminal may operate an HARQ retransmission process according to an FQAM modulation scheme and a resource allocation change rule promised in advance. For example, when an uplink and/or downlink HARQ retransmission event occurs between the base station and the terminal, the base station and the terminal may determine or confirm the modulation order of the FQAM and the allocation resource for HARQ retransmission based on the change rule promised in advance, and perform the HARQ retransmission based on the determined or confirmed FQAM modulation order and resource.

A structure for operating FQAM and an operation procedure depending on a channel state and whether to perform HARQ retransmission are described in detail with reference to FIGS. 4A to 11.

Figure 4A:
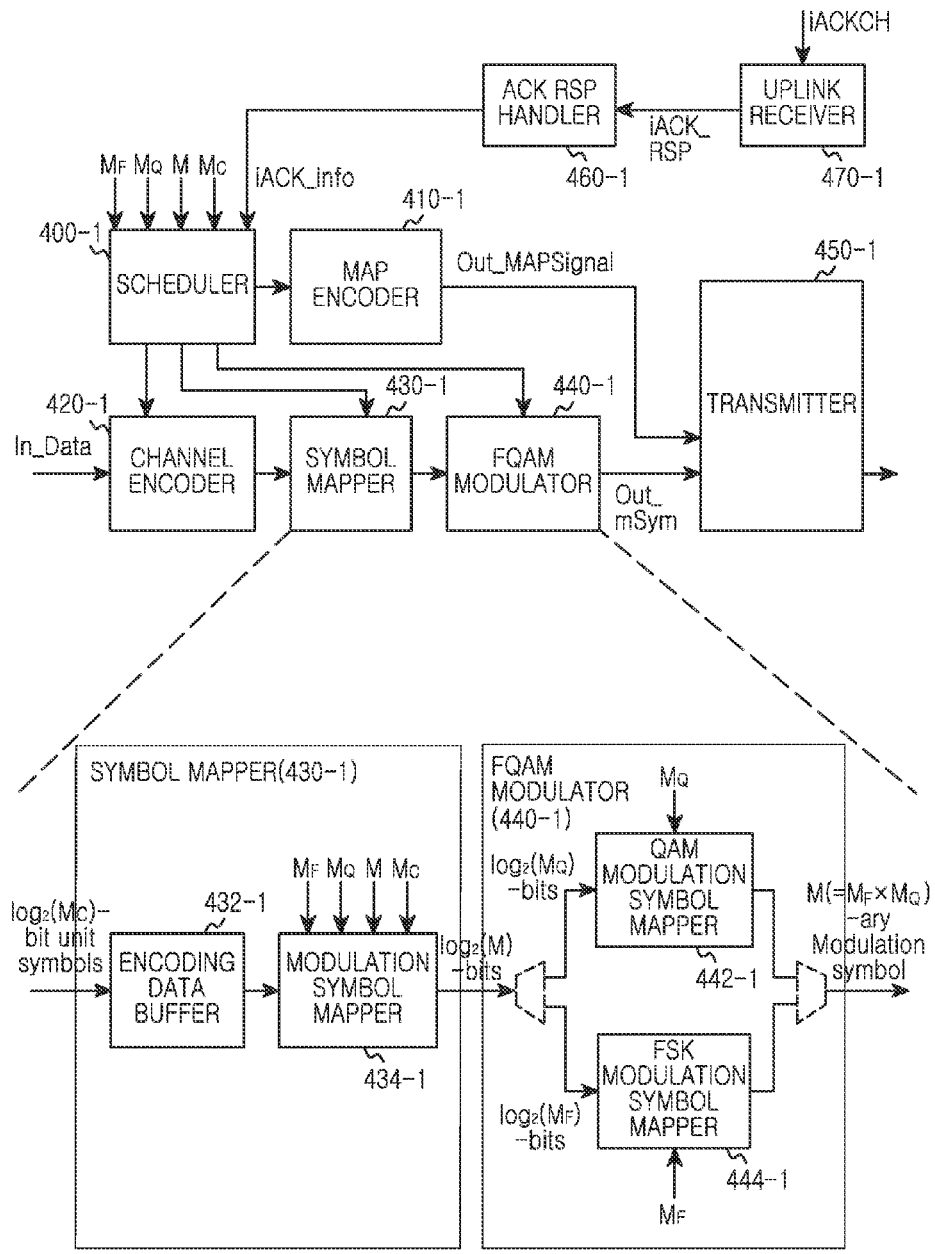
FIG. 4A is a block diagram illustrating a transmission end of a base station for downlink data transmission according to an embodiment of the present disclosure.

FIG. 4A is a block diagram illustrating a transmission end of a base station for downlink data transmission according to an embodiment of the present disclosure.

Referring to FIG. 4A, description is made on the assumption that the base station transmits a downlink HARQ burst and a terminal receives the downlink HARQ burst. As an example, in relation to FIG. 4A, the transmission end may correspond to the base station or the transmission end of the base station, and the reception end may correspond to a terminal or a reception end of the terminal.

Referring to FIG. 4A, the transmission end includes a scheduler 400-1, a map encoder 410-1, a channel encoder 420-1, a symbol mapper 430-1, an FQAM modulator 440-1, a transmitter 450-1, an ACK RSP handler 460-1, and an uplink receiver 470-1.

The scheduler 400-1 determines and changes the modulation order of an M-FQAM meeting operation criteria including a target error rate of a reception end, allocates a resource according to the determined or changed M-FQAM, and controls and processes a function for transmitting the changed modulation order and the resource allocation information to a reception end. For example, the scheduler 400-1 controls and processes a function for collecting information (or channel quality information) of a channel state with the reception end, counts an ACK response from the reception end to determine whether to perform HARQ retransmission and the number of times of retransmission, and then determines the modulation order M of the M-FQAM, the modulation order $M_Q$ of the $M_Q$-QAM, the modulation order $M_F$ of the $M_F$-FSK, and the order $M_C$ of the $M_C$-ary Coding Modulation (CM) based on the collected channel state information, whether to perform HARQ retransmission and the number of times of retransmissions, and an encoding rate of a channel code. At this point, the channel state information may include a Carrier-to-Interference and Noise Ratio (CINR), an average CINR, a dispersion or a standard deviation for a CINR, a Received Signal Strength Indicator (RSSI), an average RSSI, a dispersion or a standard deviation for an RSSI, $\alpha$ and $\beta$ representing an interference characteristic of a Complex Generalized Gaussian (CGG) interference model, and a preferred Modulation and Coding Scheme (MCS) level. For example, $\alpha$ and $\beta$ represent a shape parameter and a scaling factor, respectively, showing a degree in which the shape of a Probability Distribution Function (PDF) deviates from complex Gaussian distribution in the case in which an interference is modeled and estimated using a random variable having a CGG distribution characteristic. The random variable Z conforming to the CGG distribution may be expressed as a PDF using $\alpha$ and $\beta$ as provided in Equation (1).

$$f_z(z \mid \alpha, \beta) = \frac{\alpha}{2\pi\beta^2 \Gamma\left(\frac{2}{\alpha}\right)} \exp\left(-\left(\frac{|Z|^\alpha}{\beta}\right)\right) \quad \text{Equation (1)}$$

where $\Gamma(z)$ is a Gamma function defined by $\Gamma(z) \triangleq \int_0^\infty t^{z-1} \exp(-t)dt$.

In detail, the scheduler 400-1 determines the modulation order M of the M-FQAM depending on channel state information and determines the modulation order $M_Q$ of the $M_Q$-QAM and the modulation order $M_F$ of the $M_F$-FSK depending on the determined M. At this point, the scheduler 400-1 determines the same value as $M_C$ or an integer multiple of $M_C$ as M during HARQ initial transmission, and determines $M_F$ and $M_Q$ meeting the determined M. In contrast, during HARQ retransmission, the scheduler 400-1 may change $M_F$ and $M_Q$ depending on the number of times of retransmissions. At this point, under a situation in which the modulation order M of the M-FQAM is the same, the scheduler 400-1 may select the modulation order $M_F$ of the $M_F$-FSK and the modulation order $M_Q$ of the $M_Q$-QAM with consideration of a characteristic that power efficiency increases as the modulation order $M_F$ of the $M_F$-FSK increases or the modulation order $M_Q$ of the $M_Q$-QAM decreases, and as a bandwidth efficiency increases as the modulation order $M_F$ of the $M_F$-FSK decreases or the modulation order $M_Q$ of the $M_Q$-QAM increases. For example, according to various embodiments of the present disclosure, in the case in which NACK occurs with respect to HARQ initial transmission, the scheduler 400-1 may perform retransmission by increasing the modulation order $M_F$ of the $M_F$-FSK and decreasing the modulation order $M_Q$ of the $M_Q$-QAM while maintaining the M-FQAM used during the initial transmission at a current order in order to obtain an effect of reducing a decoding error rate with respect to the same SNR level.

The scheduler 400-1 provides at least one of the determined M, $M_F$, $M_Q$, and $M_C$ to the channel encoder 420-1, the symbol mapper 430-1, and the modulator 440-1.

The map encoder 440-1 controls and processes a function for transmitting information regarding MCS level including at least one of the determined M, $M_F$, $M_Q$, and $M_C$, a frequency and a time axis resource allocation position, and size information (position and size of Resource Block (RB)), and HARQ retransmission related information to a reception end via a MAP message or a control signal (e.g., a PDCCH signal). At this point, the scheduler 400-1 may transmit changed resource allocation information and changed information (e.g., M, $M_F$, $M_Q$, and $M_C$) regarding the modulation order of the M-FQAM depending on HARQ scheduling during initial transmission of an HARQ burst and whenever retransmission occurs. In contrast, during initial transmission, the scheduler 400-1 defines a change rule of M, $M_F$, $M_Q$, and $M_C$ depending on HARQ retransmission and corresponding resource allocation size/position information in advance, transmits the same to the reception end via a MAP message or a control signal, and operates according to a rule defined in advance without transmitting changed information to the reception end during retransmission.

The channel encoder 420-1 encodes input data in a relevant coding rate depending on $M_C$ input from the scheduler 400-1, and outputs the encoded input data. The channel encoder may operate as a binary channel encoder and a non-binary channel encoder under control of the scheduler 400-1.

The symbol mapper 430-1 temporarily stores a bit string output from the channel encoder 420-1 in an encoding data buffer 432-1, and maps the bit string stored in the encoding data buffer 432-1 to a complex symbol using a modulation symbol mapper 434-1 under control of the scheduler 400-1 by including the encoding data buffer 432-1 and the modulation symbol mapper 434-1. At this point, the modulation symbol mapper 434-1 divides K bit strings to modulate into upper bits and lower bits and maps the K bit strings to a complex symbol based on MCS level information provided from the scheduler 400-1, that is, at least one of M, $M_F$, $M_Q$, and $M_C$.

The FQAM modulator 440-1 is configured by combination of a QAM modulation symbol mapper 442-1 and an FSK modulation symbol mapper 444-1 according to various embodiments of the present disclosure. The FQAM modulator 440-1 determines the modulation orders M, $M_F$, and $M_Q$, and maps a portion of input symbols to each constellation point corresponding to $M_Q$-QAM using the QAM modulation symbol mapper 442-1 and outputs the same, and maps a portion of input symbols to each FSK tone corresponding to $M_F$-FSK modulation scheme using the FSK modulation symbol mapper 444-1 under control of the scheduler 400-1. According to various embodiments of the present disclosure, as illustrated in FIGS. 1 to 3, the FQAM modulator 440-1 may divide input information bits to first bit strings and second bit strings, select an $M_F$-FSK frequency tone for the first bit string, and select a constellation point of the $M_Q$-QAM for the second bit string, thereby performing modulation such that the selected constellation point may be transmitted via the selected frequency tone.

The transmitter 450-1 transmits a modulation symbol output from the FQAM modulator 440-1 to the reception end.

The ACK RSP handler 460-1 determines an ACK/NACK signal from a signal input from the uplink receiver 470-1, when ACK is received, informs the scheduler 400-1 that data transmission has been successfully performed, and when NACK is received, informs the scheduler 400-1 that retransmission is required due to transmission failure of relevant data together with the number of times in which NACK has been received with respect to the relevant data. In addition, the ACK RSP handler 460-1 obtains information of a channel state with the reception end from a signal received from the uplink receiver 470-1, and transmits the obtained channel state information to the scheduler 400-1.

The uplink receiver 470-1 receives an uplink signal transmitted from the reception end and provides the same to the ACK RSP handler 460-1.

Figure 4B:
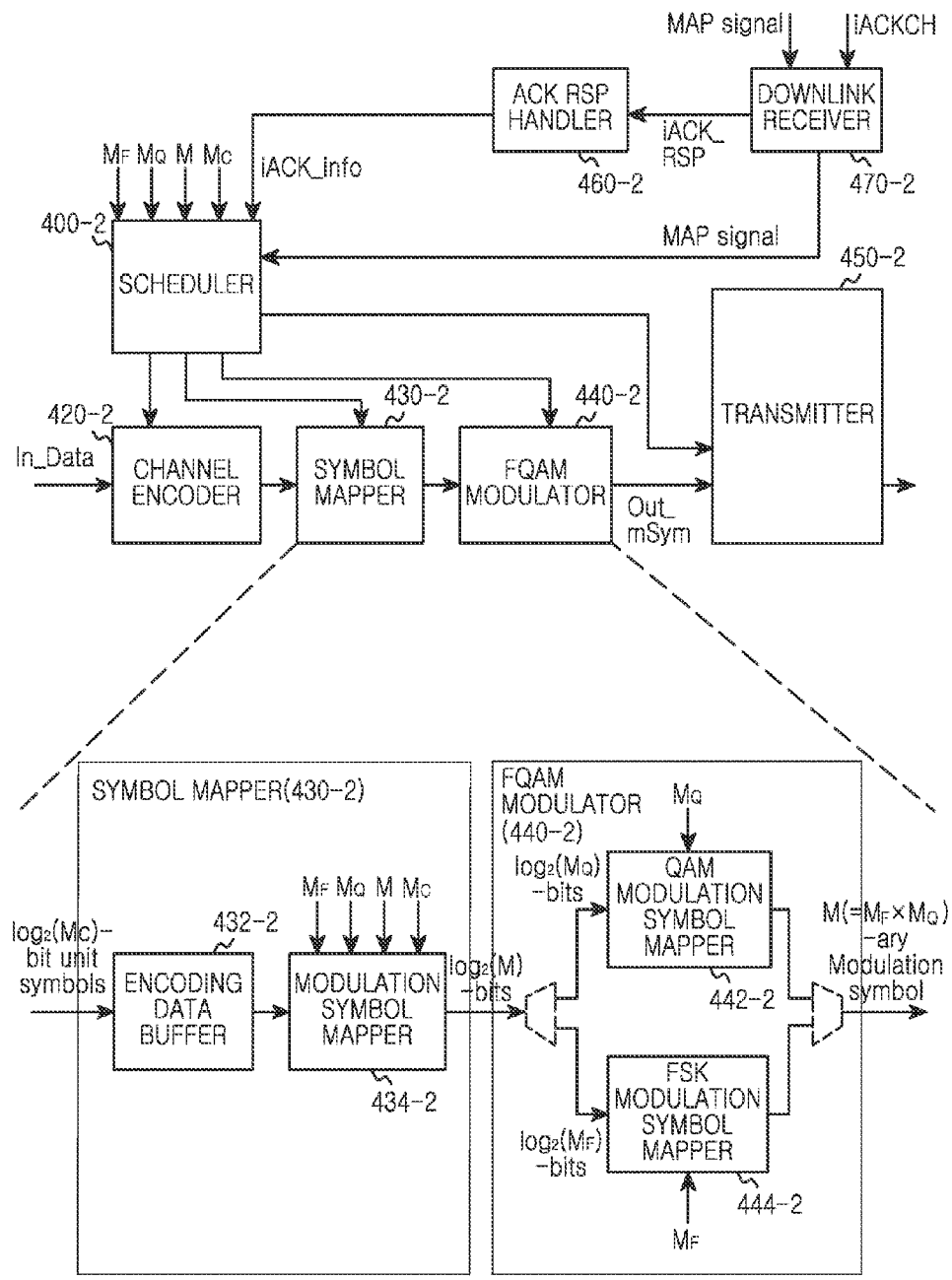
FIG. 4B is a block diagram illustrating a transmission end of a terminal for uplink data transmission according to an embodiment of the present disclosure.

FIG. 4B is a block diagram illustrating a transmission end of a terminal for uplink data transmission according to an embodiment of the present disclosure.

Referring to FIG. 4B, a description is made on the assumption that a terminal transmits an uplink HARQ burst and a base station receives the uplink HARQ burst. As an example, in relation to FIG. 4B, the transmission end may correspond to a terminal or the transmission end of the terminal, and a reception end may correspond to a base station or the reception end of the base station.

Referring to FIG. 4B, the transmission end may include a scheduler 400-2, a channel encoder 420-2, a symbol mapper 430-2, an FQAM modulator 440-2, a transmitter 450-2, an ACK RSP handler 460-2, and a downlink receiver 470-2.

The scheduler 400-2 controls and processes a function for receiving the modulation order of an M-FQAM meeting operation criteria including a target error rate and resource allocation information from a base station which is a reception end, and transmitting data based on the received modulation order of the M-FQAM and resource allocation information. For example, the scheduler 400-2 may receive an uplink MAP signal via the downlink receiver 470-2 and a map decoder (not shown), and determine information regarding the modulation order of the M-FQAM and the resource allocation information from the uplink MAP signal. As another example, the scheduler 400-2 may determine the information regarding the modulation order of the M-FQAM and the resource allocation information from a control signal (e.g., PDCCH signal) received via the downlink receiver 470-2. The information regarding the modulation order of the M-FQAM may include the modulation order M of the M-FQAM, the modulation order $M_Q$ of the $M_Q$-QAM, the modulation order $M_F$ of the $M_F$-FSK, and the order $M_C$ of the $M_C$-ary CM. Additionally, the scheduler 400-2 may receive a change rule of M, $M_F$, $M_Q$, and $M_C$ depending on HARQ retransmission, and corresponding resource allocation size/position information via the downlink receiver 470-2.

According to various embodiments of the present disclosure, the scheduler 400-2 may receive information regarding the modulation order of the M-FQAM and resource allocation information for retransmission from the reception end via the downlink receiver 470-2 whenever HARQ retransmission occurs. According various embodiments of the present disclosure, the scheduler 400-2 may count an ACK response from the reception end to determine whether to perform HARQ retransmission and the number of times of retransmissions, and then change the modulation order M of the M-FQAM, the modulation order $M_Q$ of the $M_Q$-QAM, the modulation order $M_F$ of the $M_F$-FSK, and the order $M_C$ of the $M_C$-ary CM according to a change rule set in advance based on whether to perform HARQ retransmission, the number of times of retransmissions, and the information regarding the modulation order of the M-FQAM received from the reception end.

The scheduler 400-2 provides at least one of M, $M_F$, $M_Q$, and $M_C$ obtained from the reception end or obtained by the change rule set in advance to the channel encoder 420-2, the symbol mapper 430-2, and the modulator 440-2.

The channel encoder 420-2 encodes input data using a relevant coding rate depending on $M_C$ input from the scheduler 400-2, and outputs the encoded input data. The channel encoder may operate as a binary channel encoder and a non-binary channel encoder under control of the scheduler 400-2.

The symbol mapper 430-2 temporarily stores a bit string output from the channel encoder 420-2 in an encoding data buffer 432-2, and maps the bit string stored in the encoding data buffer 432-2 to a complex symbol using a modulation symbol mapper 434-2 under control of the scheduler 400-1 by including the encoding data buffer 432-2 and the modulation symbol mapper 434-2. At this point, the modulation symbol mapper 434-2 divides K bit strings to modulate into upper bits and lower bits and maps the K bit strings to a complex symbol based on MCS level information provided from the scheduler 400-2, that is, at least one of M, $M_F$, $M_Q$, and $M_C$.

The FQAM modulator 440-2 is configured by combination of a QAM modulation symbol mapper 442-2 and an FSK modulation symbol mapper 444-2 according to an embodiment of the present disclosure. The FQAM modulator 440-2 determines the modulation orders M, $M_F$, and $M_Q$, and maps a portion of input symbols to each constellation point corresponding to $M_Q$-QAM using the QAM modulation symbol mapper 442-2 and outputs the same, and maps a portion of input symbols to each FSK tone corresponding to $M_F$-FSK modulation scheme using the FSK modulation symbol mapper 444-2 under control of the scheduler 400-2. According to various embodiments of the present disclosure, as illustrated in FIGS. 1 to 3, the FQAM modulator 440-2 may divide input information bits to first bit strings and second bit strings, select an $M_F$-FSK frequency tone for the first bit string, and select a constellation point of the $M_Q$-QAM for the second bit string, thereby performing modulation such that the selected constellation point may be transmitted via the selected frequency tone.

The transmitter 450-2 transmits a modulation symbol output from the FQAM modulator 440-2 to the reception end.

The ACK RSP handler 460-2 determines an ACK/NACK signal from a signal input from the downlink receiver 470-2, when ACK is received, informs the scheduler 400-2 that data transmission has been successfully performed, and when NACK is received, informs the scheduler 400-2 that retransmission is required due to transmission failure of relevant data together with the number of times in which NACK has been received with respect to the relevant data.

The downlink receiver 470-2 receives a downlink signal transmitted from the reception end, and provides the same to the ACK RSP handler 460-2. For example, when receiving an ACK or NACK signal from the reception end, the downlink receiver 470-2 provides the received ACK or NACK signal to the ACK RSP handler 460-2. As another example, when receiving an uplink MAP signal for uplink data transmission from the reception end, the downlink receiver 470-2 may provide the received MAP signal to the scheduler 400-2 via a map decoder (not shown). As another example, when receiving a control signal for uplink data transmission, the downlink receiver 470-2 may provide the received control signal to the scheduler 400-2.

In FIGS. 4A and 4B, in the case in which an input/output signal (data) name between block configurations of the terminal is the same as an input/output signal (data) name between block configurations of the base station, the common naming scheme merely indicates that a physical meaning of relevant signals is the same, and the configuration and/or structure of the relevant signals is not the same. For example, a signal iACK_RSP output from the uplink receiver 470-1 to the ACK RSP handler 460-1 of FIG. 4A, and a signal iACK_RSP output from the uplink receiver 470-2 to the ACK RSP handler 460-2 of FIG. 4B are the same in their respective meanings in that the iACK_RSP signals generally correspond ACK/NACK signals, but iACK_RSP of FIG. 4A and iACK_RSP of FIG. 4B may be different signals whose configuration and/or structure is different from each other.

Figure 5A:
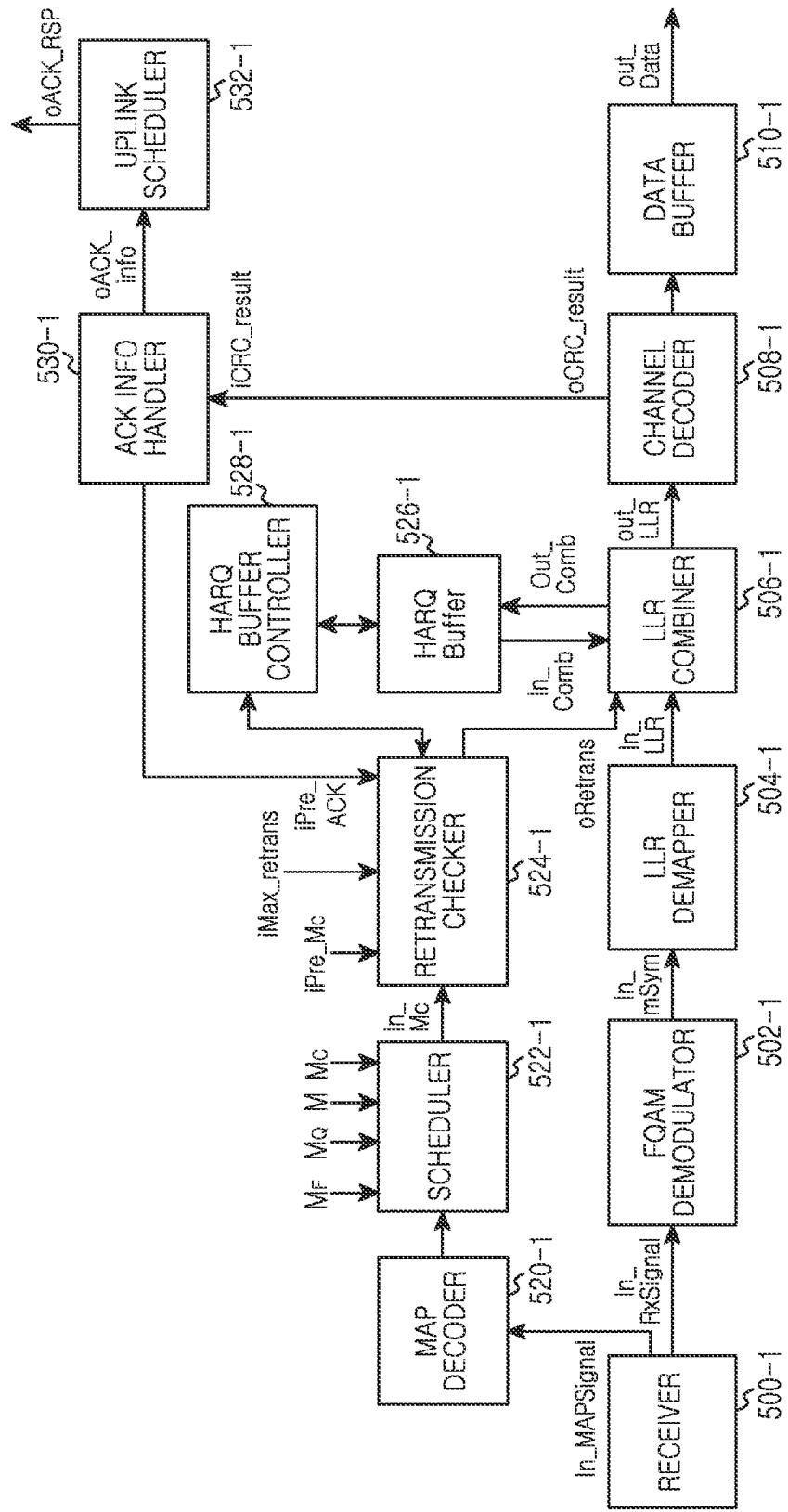
FIG. 5A is a block diagram illustrating a reception end of a terminal for downlink data reception according to an embodiment of the present disclosure.

FIG. 5A is a block diagram illustrating a reception end of a terminal for downlink data reception according to an embodiment of the present disclosure.

Referring to FIG. 5A, description is made on the assumption that a base station transmits an HARQ burst, and the terminal receives the HARQ burst. As an example, in relation to FIG. 5A, the reception end may correspond to the terminal or the reception end of the terminal, and a transmission end may correspond to a base station or a transmission end of the base station. Referring to FIG. 5A, the reception end may include a receiver 500-1, an FQAM demodulator 502-1, a Log Likelihood Ratio (LLR) demapper 504-1, an LLR combiner 506-1, a channel decoder 508-1, a data buffer 510-1, a map decoder 520-1, a scheduler 522-1, a retransmission checker 524-1, an HARQ buffer 526-1, an HARQ buffer controller 528-1, an ACK info handler 530-1, and an uplink scheduler 532-1.

The receiver 500-1 receives a signal from a transmission end to provide an HARQ burst to the FQAM demodulator 502-1 and provide a MAP message or a control signal (e.g., PDCCH signal) to the map decoder 520-1.

The FQAM demodulator 502-1 demodulates an input signal depending on a modulation scheme of the transmission end, and provides the demodulation result to the LLR demapper 504-1 under control of the scheduler 522-1.

The LLR demapper 504-1 generates LLR values on an M dimension LLR vector basis from the FQAM demodulator 502-1, and outputs the LLR values to the LLR combiner 506-1. The LLR combiner 506-1 combines an LLR value of an initially transmitted HARQ burst and an LLR value of retransmitted HARQ burst. For this purpose, the LLR combiner 506-1 outputs an LLR value of the initially transmitted HARQ burst to the HARQ buffer 526-1, generates an LLR value of a retransmitted HARQ burst, and then receives the LLR value of the initially transmitted HARQ burst from the HARQ buffer 526-1 to combine the two LLR values under control of the retransmission checker 524-1.

The channel decoder 508-1 performs channel decoding using LLR values provided from the LLR combiner 506-1, and determines whether decoding is successful. At this point, when determining that decoding is successful, the channel decoder 508-1 outputs the decoding result to the data buffer 510-1. In addition, the channel decoder 508-1 outputs a signal representing whether decoding is successful to the ACK info handler 530-1.

The map decoder 520-1 decodes a MAP message or a control signal received via the receiver 500-1 to obtain an MCS level used by the transmission end, the position and size information of an allocated resource, and information related to HARQ retransmission, and provides the obtained information to the scheduler 522-1. Particularly, the map decoder 520-1 may obtain an MCS level, the position and size information of an allocated resource, and information related to HARQ retransmission from the transmission end via a MAP message or a control signal during initial transmission of an HARQ burst and whenever retransmission occurs, and may obtain an MCS level, the position and size information of an allocated resource, and information related to HARQ retransmission from the transmission end via a MAP message or a control signal only during the initial transmission of the HARQ.

Particularly, the scheduler 522-1 may receive changed allocation information from the transmission end via the map decoder 520-1 during the initial transmission of the HARQ burst and whenever retransmission occurs, and may receive allocation information from the transmission end via the map decoder 520-1 only during the initial transmission of the HARQ.

The scheduler 522-1 controls and processes a function for receiving an HARQ burst from the transmission end, and decoding the received HARQ burst based on the information obtained from the map decoder 520-1. For example, the scheduler 522-1 controls and processes a function for determining a modulation technique and a coding technique used by the transmission end from the received MCS level, demodulating and decoding the received signal depending on the determined modulation technique and coding technique. Particularly, according to various embodiments of the present disclosure, the scheduler 522-1 controls and processes a function for receiving MCS level information, position and size information of an allocated resource, and HARQ retransmission related information during the initial transmission of the HARQ burst and whenever retransmission occurs, and demodulating and decoding the HARQ burst from the transmission end. In contrast, according to various embodiments of the present disclosure, the scheduler 522-1 may receive MCS level information, position and size information of an allocated resource, and HARQ retransmission related information via the map decoder 520-1 only during the initial transmission of the HARQ burst. At this point, the received MCS level information, position and size information of an allocated resource, and HARQ retransmission related information may include not only information regarding the initial transmission of the HARQ burst but also information regarding retransmission of the HARQ burst, or may include information regarding a rule for a case in which retransmission of the HARQ burst occurs.

The retransmission checker 524-1 determines whether to perform initial transmission of an HARQ burst and retransmission of the HARQ burst depending on a signal from the scheduler 522-1, the HARQ buffer 526-1, and the ACK info handler 530-1. For example, when an ACK signal is provided from the ACK info handler 530-1, because the scheduler 522-1 has successfully decoded the previous HARQ burst, the scheduler 522-1 may determine the next HARQ burst as initial transmission data. In contrast, when an NACK signal is provided from the ACK info handler 530-1, because decoding of the previous HARQ burst has failed, the retransmission checker 524-1 may determine the next HARQ burst as retransmission data. At this point, the retransmission checker 524-1 controls the HARQ buffer controller 528-1 to store an LLR of the initially transmitted HARQ burst in the HARQ buffer 526-1, and then controls the LLR to combine with an LLR of a retransmitted HARQ burst and be output to the channel decoder 508-1. With the next HARQ burst determined as retransmission data, in the case in which the modulation order M received from the scheduler 522-1 is different from a previously received modulation order M, or the dimension of an LLR of the previous HARQ burst is different from the dimension of an LLR of the next HARQ burst, the retransmission checker 524-1 may recognize that the reception end has not received retransmission data from the transmission end, and a retransmission process for the previous HARQ burst has ended and a retransmission process for a new HARQ burst has started.

The HARQ buffer 526-1 stores an LLR from the LLR combiner 506-1. The HARQ buffer controller 528-1 controls a function for outputting an LLR previously stored in the HARQ buffer 526-1 to the LLR combiner 506-1 under control of the retransmission checker 524-1.

The ACK info handler 530-1 receives whether channel decoding has succeeded from the channel decoder 508-1, when the channel decoding has succeeded, generates an ACK message, and when the channel decoding has failed, generates an NACK message to provide the same to the uplink scheduler 532-1. In addition, the ACK info handler 530-1 provides a signal representing whether an ACK message has been generated or an NACK message has been generated with respect to the previous HARQ burst.

The uplink scheduler 532-1 receives an ACK message or an NACK message from the ACK info handler 530-1, and transmits the same to the transmission end.

Figure 5B:
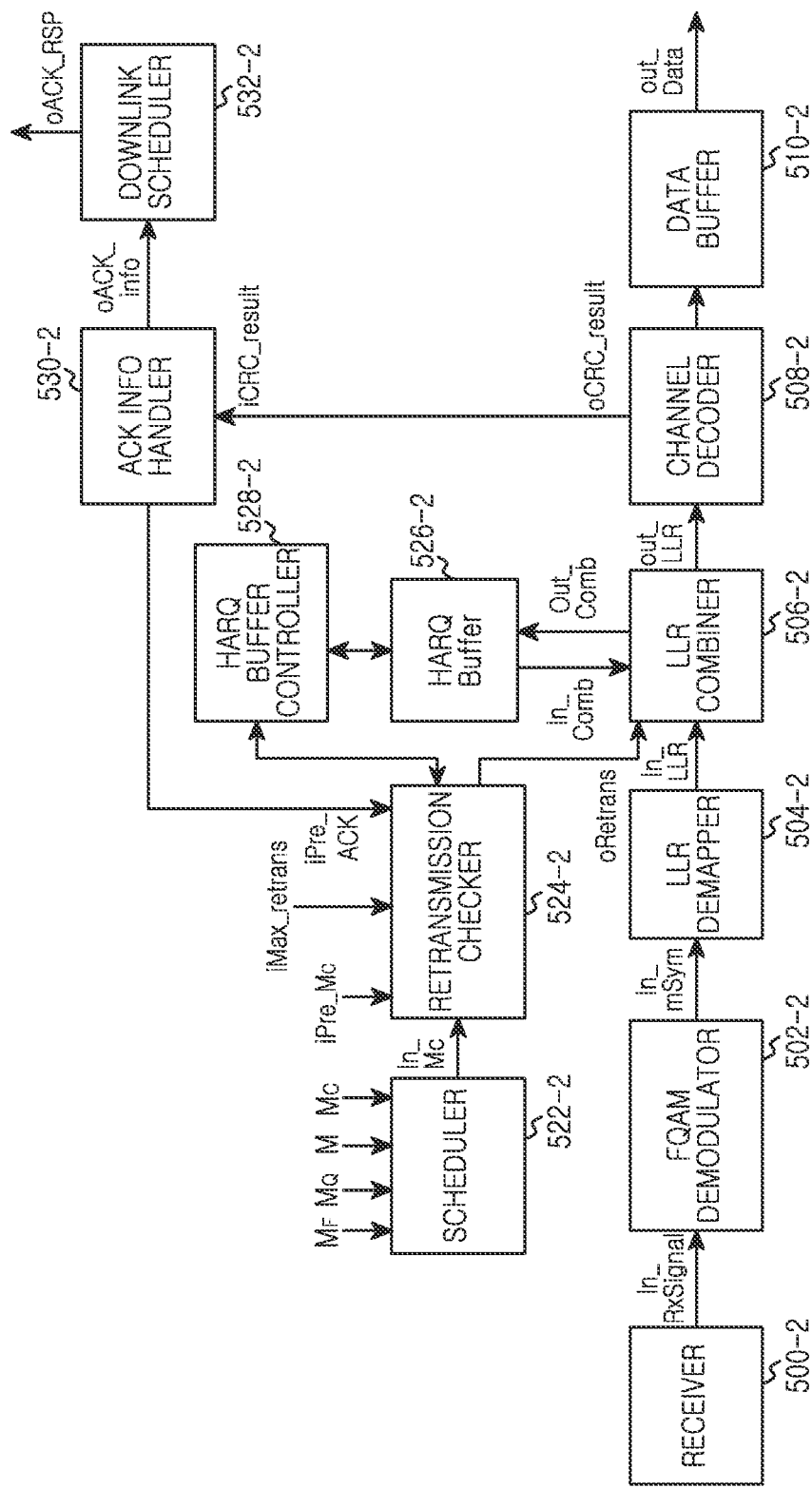
FIG. 5B is a block diagram illustrating a reception end of a terminal for uplink data reception according to an embodiment of the present disclosure.

FIG. 5B is a block diagram illustrating a reception end of a terminal for uplink data reception according to an embodiment of the present disclosure.

Referring to FIG. 5B, a description is made on the assumption that a terminal transmits an HARQ burst, and the base station receives the HARQ burst. As an example, in relation to FIG. 5B, the reception end may correspond to the base station or the reception end of the base station, and a transmission end may correspond to a terminal or a transmission end of the terminal.

Referring to FIG. 5B, the reception end may include a receiver 500-2, an FQAM demodulator 502-2, an LLR demapper 504-2, an LLR combiner 506-2, a channel decoder 508-2, a data buffer 510-2, a scheduler 522-2, a retransmission checker 524-2, an HARQ buffer 526-2, an HARQ buffer controller 528-2, an ACK info handler 530-2, and an uplink scheduler 532-2.

The receiver 500-2 receives a signal from a transmission end to provide the same to the demodulator 502-2. For example, the receiver 500-2 provides an HARQ burst received from the transmission end to the FQAM demodulator 502-2.

The FQAM demodulator 502-2 demodulates an input signal depending on a modulation scheme of the transmission end and provides the demodulation result to the LLR demapper 504-2 under control of the scheduler 522-2.

The LLR demapper 504-2 generates LLR values on an M dimension LLR vector basis from the result from the FQAM demodulator 502-2, and outputs the LLR values to the LLR combiner 506-2. The LLR combiner 506-2 combines an LLR value of an initially transmitted HARQ burst and an LLR value of a retransmitted HARQ burst. For this purpose, the LLR combiner 506-2 outputs the LLR value of the initially transmitted HARQ burst to the HARQ buffer 526-2, generates an LLR value of a retransmitted HARQ burst, and then receives the LLR value of the initially transmitted HARQ burst from the HARQ buffer 526-2 to combine the two LLR values under control the retransmission checker 524-2.

The channel decoder 508-2 performs channel decoding using LLR values provided from the LLR combiner 506-2, and determines whether decoding is successful. At this point, when determining decoding is successful, the channel decoder 508-2 outputs the decoding result to the data buffer 510-2. In addition, the channel decoder 508-2 outputs a signal representing whether decoding is successful to the ACK info handler 530-2.

The scheduler 522-2 controls and processes a function for determining and changing the modulation order of the M-FQAM meeting operation criteria including a target error rate, allocating a resource depending on the determined and changed M-FQAM, and transmitting the changed modulation order and resource allocation information to the transmission end. For example, the scheduler 522-2 controls and processes a function for collecting information (or channel quality information) of a channel state with the transmission end, determines whether to perform HARQ retransmission and the number of times of HARQ retransmissions, and then determines or changes the modulation order M of the M-FQAM, the modulation order $M_Q$ of the $M_Q$-QAM, the modulation order $M_F$ of the $M_F$-FSK, and the order $M_C$ of the $M_C$-ary CM based on the collected channel state information, whether to perform HARQ retransmission and the number of times of HARQ retransmissions, and an encoding rate of a channel code. For example, the scheduler 522-2 may determine and change the modulation order of the M-FQAM in the same way as the scheduler 400-1 in FIG. 4A. In addition, the scheduler 522-2 controls and processes a function for transmitting the modulation order of the M-FQAM and resource allocation information to the transmission end using a retransmission uplink MAP signal or a control signal. For example, the scheduler 522-2 may transmit MCS level information, the position and size information of an allocated resource, and HARQ retransmission related information to the transmission end during the initial transmission of the HARQ burst and whenever retransmission of the HARQ occurs, and may transmit the MCS level information, the position and size information of an allocated resource, and the HARQ retransmission related information only during the initial transmission of the HARQ. In addition, during the initial transmission of the HARQ, the scheduler 522-2 may transmit a change rule regarding the modulation order of the M-FQAM.

The scheduler 522-2 controls and processes a function for receiving an HARQ burst from the transmission end and decoding the received HARQ burst based on resource allocation information. For example, the scheduler 522-2 controls and processes a function for determining a modulation technique and a coding technique used by the transmission end, and demodulating and decoding a received signal depending on the determined modulation technique and coding technique based on a determined or changed MCS level.

The retransmission checker 524-2 determines whether to perform initial transmission of the HARQ burst and to perform retransmission of the HARQ burst depending on a signal from the scheduler 522-2, the HARQ buffer 526-2, and the ACK info handler 530-2. For example, when an ACK signal is provided from the ACK info handler 530-2, because the previous HARQ burst has been successfully decoded, the retransmission checker 524-2 may determine the next HARQ burst as initial transmission data. In contrast, when an NACK signal is provided from the ACK info handler 530-2, because decoding of the previous HARQ burst has failed, the retransmission checker 524-2 may determine the next HARQ burst as retransmission data. At this point, the retransmission checker 524-2 controls the HARQ buffer controller 528-2 to store the LLR of the initially transmitted HARQ burst in the HARQ buffer 526-2, and then controls the LLR to combine with an LLR of a retransmitted HARQ burst and be output to the channel decoder 508-2. With the next HARQ burst determined as retransmission data, in the case in which the modulation order M received from the scheduler 522-2 is different from a previously received modulation order M, or the dimension of an LLR of the previous HARQ burst is different from the dimension of an LLR of the next HARQ burst, the retransmission checker 524-2 may recognize that the reception end has not received retransmission data from the transmission end, and a retransmission process for the previous HARQ burst has ended and a retransmission process for a new HARQ burst has started.

The HARQ buffer 526-2 stores an LLR from the LLR combiner 506-2. The HARQ buffer controller 528-2 controls a function for outputting an LLR previously stored in the HARQ buffer 526-2 to the LLR combiner 506-2 under control of the retransmission checker 524-2.

The ACK info handler 530-2 receives whether channel decoding has succeeded from the channel decoder 508-2, when the channel decoding has succeeded, generates an ACK message, and when the channel decoding has failed, generates an NACK message to provide the same to the downlink scheduler 532-2. In addition, the ACK info handler 530-2 provides a signal representing whether an ACK message has been generated or an NACK message has been generated with respect to the previous HARQ burst.

The downlink scheduler 532-2 receives an ACK message or an NACK message from the ACK info handler 530-2, and transmits the same to the transmission end.

In FIGS. 5A and 5B, in the case in which an input/output signal (data) name between block configurations of the terminal is the same as an input/output signal (data) name between block configurations of the base station, the common naming scheme merely indicates that a physical meaning of relevant signals is the same, and the configuration and/or structure of the relevant signals is not the same. For example, a signal oACK_info output from the ACK info handler 530-1 to the uplink scheduler 532-1 of FIG. 5A and a signal oACK_info output from the ACK info handler 530-2 to the uplink scheduler 532-2 of FIG. 5B are the same in their respective meaning in that the oACK_info signals generally correspond to generated ACK/NACK signals, but oACK_info of FIG. 5A and oACK_info of FIG. 5B may be different signals whose configuration and/or structure is different from each other.

Hereinafter, according to various embodiments of the present disclosure, description is made on a case in which a base station explicitly represents the modulation order of an FQAM and resource allocation information for HARQ retransmission via a MAP message or a control signal (e.g., PDCCH signal) depending on a system with reference to FIGS. 6, 7, and 8. For convenience in description, downlink transmission where a base station transmits an HARQ burst to a terminal is exemplarily described. However, a method of explicitly representing the modulation order of the FQAM and resource allocation information described blow is equally applicable to uplink transmission where the terminal transmits an HARQ burst to the base station.

Figure 6:
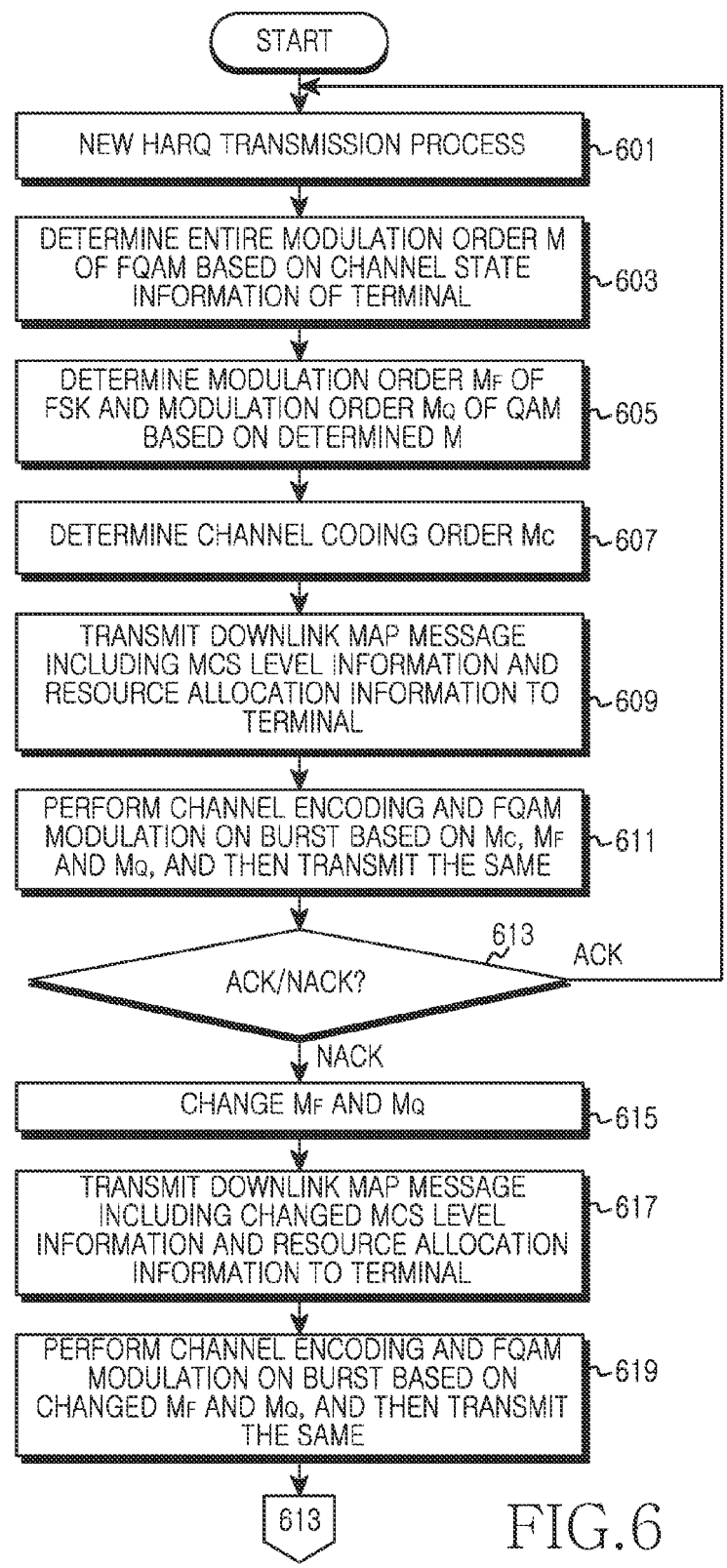
FIG. 6 is a flowchart illustrating a procedure for operating FQAM with consideration of a Hybrid Automatic Repeat reQuest (HARQ) technique in a base station according to an embodiment of the present disclosure.

FIG. 6 is a flowchart illustrating a procedure for operating FQAM with consideration of an HARQ technique in a base station according to an embodiment of the present disclosure.

Referring to FIG. 6, at operation 601, the base station determines start of a new HARQ transmission process. For example, the base station determines start of a new HARQ transmission process with respect to a burst to transmit.

Thereafter, at operation 603, the base station determines the modulation order M of an FQAM based on channel state information of a terminal. At this point, the channel state information may include a CINR, an average CINR, a standard deviation for a CINR, an RSSI, α and β representing an interference characteristic of a CGG interference model, and a preferred MCS level.

At operation 605, the base station determines the modulation order $M_F$ of the $M_F$-FSK, and the modulation order $M_Q$ of $M_Q$-QAM forming the M-FQAM based on the modulation order M of the M-FQAM. At this point, the modulation order $M_F$ and the modulation order $M_Q$ should be determined as values such that the product of the two values becomes the same value as the modulation order M of the FQAM (M=$M_F$× $M_Q$). At this point, under a situation in which the modulation order M of the M-FQAM is the same, the base station may determine the modulation order $M_F$ of the $M_F$-FSK and the modulation order $M_Q$ of the $M_Q$-QAM with consideration of a characteristic that power efficiency increases as the modulation order $M_F$ of the $M_F$-FSK increases, and bandwidth efficiency increases as the modulation order $M_F$ of the $M_F$-FSK decreases.

Thereafter, at operation 607, the base station determines a channel coding order $M_C$. The channel coding order $M_C$ may be determined depending on channel state information and an encoding rate of a channel code. In addition, the channel coding order $M_C$ may be determined based on the modulation order M of the M-FQAM. In contrast, in the case in which the channel coding order $M_C$ is determined in advance, the modulation order M of the M-FQAM may be determined based on the channel coding order $M_C$. For example, the modulation order M of the M-FQAM may be determined as the same value as $M_C$ or a value corresponding to an integer multiple of $M_C$.

Thereafter, at operation 609, the base station transmits, to a terminal, a downlink MAP message including MCS level information including at least one of M, $M_F$, $M_Q$, and $M_C$, and resource allocation information determined at operations 603 to 607.

Thereafter, at operation 611, the base station performs channel encoding and FQAM modulation on an HARQ burst based on $M_F$, $M_Q$, and $M_C$, and then transmits the same.

Thereafter, at operation 613, the base station determines whether an ACK message or an NACK message is received from the terminal.

If the base station determines an ACK message is received at operation 613, then the base station determines that the relevant HARQ burst has been successfully transmitted, and returns to operation 601.

In contrast, if the base station determines that an NACK message is received at operation 613, then the base station determines that the relevant HARQ burst has not been successfully transmitted, and proceeds to operation 615 at which the base station changes the modulation order $M_F$ of the $M_F$-FSK and the modulation order $M_Q$ of the $M_Q$-QAM. At this point, with the modulation order M of the M-FQAM used during initial transmission of the relevant HARQ burst maintained, the base station changes the modulation order $M_F$ of the $M_F$-FSK and the modulation order $M_Q$ of the $M_Q$-QAM. According to various embodiments of the present disclosure, the base station may count an ACK response received from the terminal to determine the number of times of retransmissions, change the modulation order $M_Q$ of the $M_Q$-QAM and the modulation order $M_F$ of the $M_F$-FSK based on collected channel state information, the number of times of retransmissions, and the encoding rate of the channel code, and additionally change the order $M_C$ of the $M_C$-ary CM.

Thereafter, at operation 617, the base station transmits a downlink MAP message including the changed MCS level information and resource allocation information changed depending on the change of the MCS level information to the terminal.

Thereafter, at operation 619, the base station performs channel encoding and FQAM modulation on the HARQ burst based on the changed $M_F$ and $M_Q$, and $M_C$ determined at operation 607, and then transmits the same.

Thereafter, the base station proceeds to operation 613 to re-perform subsequent steps.

In FIG. 6, although description has been made by dividing operations 603 to 607 into three operations for convenience in description, operations 603 to 607 may be performed simultaneously. In addition, according to various embodiments of the present disclosure, the base station may omit the process of determining the modulation order M of the M-FQAM in operation 603, and immediately determine the modulation order $M_F$ of the $M_F$-FSK and the modulation order $M_Q$ of the $M_Q$-QAM.

Figure 7:
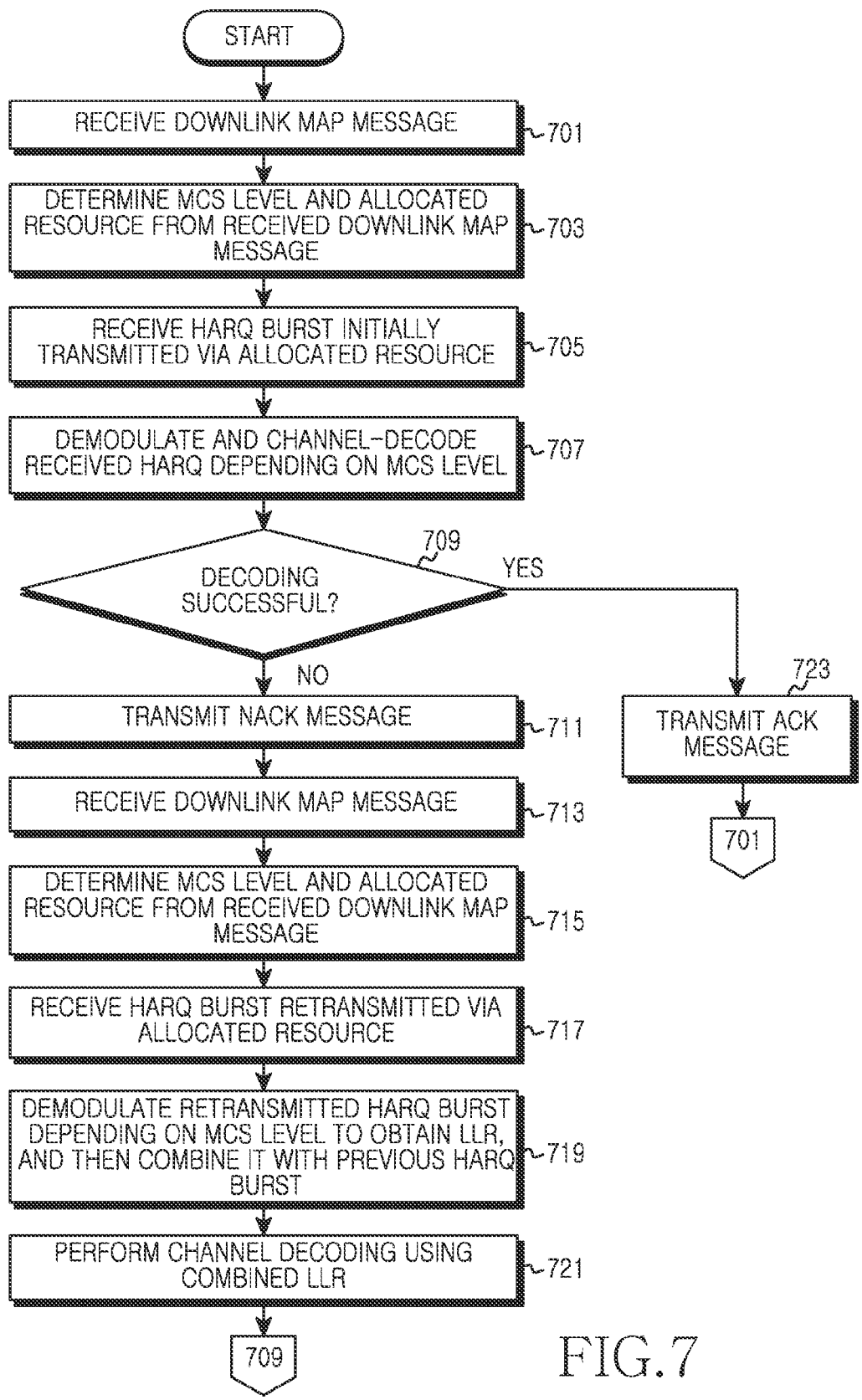
FIG. 7 is a flowchart illustrating a procedure for operating FQAM with consideration of an HARQ technique in a terminal according to an embodiment of the present disclosure.

FIG. 7 is a flowchart illustrating a procedure for operating FQAM with consideration of an HARQ technique in a terminal according to an embodiment of the present disclosure.

Referring to FIG. 7, at operation 701, the terminal receives a downlink MAP message from a base station.

Thereafter, at operation 703, the terminal determines an MCS level and an allocated resource from the downlink MAP message. The MCS level includes at least one of M, $M_F$, $M_Q$, and $M_C$ determined by the base station.

Thereafter, at operation 705, the terminal receives an HARQ burst initially transmitted via an allocated resource.

At operation 707, the terminal demodulates the received HARQ burst depending on the MCS level and then performs channel decoding.

Thereafter, at operation 709, the terminal determines whether the channel decoding has been successfully performed.

If the terminal determines that the channel decoding has been successfully performed at operation 709, then the terminal proceeds to operation 723 at which the terminal transmits an ACK message to the base station. Thereafter, the terminal returns to operation 701.

In contrast, if the terminal determines that the channel decoding has not been successfully performed at operation 709, then the terminal proceeds to operation 711 at which the terminal transmits an NACK message to the base station.

Thereafter, at operation 713, the terminal receives a downlink MAP message at operation 713.

At operation 715, the terminal determines a changed MCS level and an allocated resource for HARQ retransmission from the downlink MAP message.

Thereafter, at operation 717, the terminal receives an HARQ burst retransmitted via the resource allocated for the HARQ retransmission.

Thereafter, at operation 719, the terminal demodulates the retransmitted HARQ burst using the MCS level changed for the HARQ retransmission to obtain an LLR, and combines the obtained LLR with the previously received LLR of the relevant HARQ burst (e.g., an initial transmission HARQ burst) or an LLR combined and stored up to a point of the previous HARQ retransmission.

Thereafter, at operation 721, the terminal performs channel decoding using the combined LLR.

Thereafter, the terminal returns to operation 709 to re-perform subsequent steps.

Figure 8:
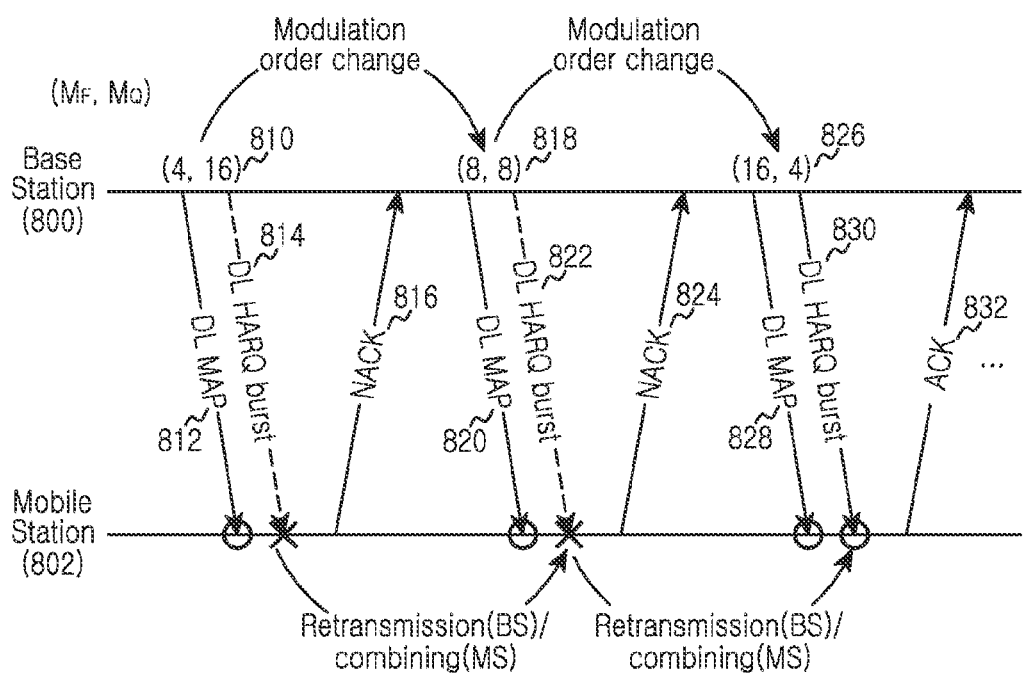
FIG. 8 is a view illustrating an example of operating FQAM in an HARQ system according to an embodiment of the present disclosure.

FIG. 8 is a view illustrating an example of operating FQAM in an HARQ system according to an embodiment of the present disclosure.

Referring to FIG. 8, description is made on the assumption that the modulation order M of the M-FQAM is determined as 64.

As illustrated in FIG. 8, according to various embodiments of the present disclosure, at operation 810, a base station 800 determines the modulation order of the $M_F$-FSK as 4 with consideration of channel state information and determines the modulation order of the $M_Q$-QAM as 16.

Thereafter, at operation 812, the base station 800 transmits a downlink MAP message including resource allocation information for a terminal 802, the modulation order of the $M_F$-FSK, and the modulation order of the $M_Q$-QAM to the terminal 802.

At operation 814, the base station 800 transmits a downlink HARQ burst modulated using 4-FSK and 16-QAM to the terminal 802.

At operation 812, the terminal 802 determines a resource allocated by the base station 800 from the downlink MAP message and determines that the base station 800 has modulated an HARQ burst using 4-FSK and 16-QAM.

At operation 814, the terminal 802 demodulates a received downlink HARQ burst using a demodulation scheme corresponding to 4-FSK and 16-QAM.

At operation 816, if the terminal 802 has not successfully decoded the downlink HARQ burst, the terminal 802 transmits an NACK message to the base station 800.

At operation 818, the base station 800 that has received the NACK message increases the modulation order of the $M_F$-FSK to 8, and reduces the modulation order of the $M_Q$-QAM to 8.

At operation 820, the base station 800 transmits a downlink MAP message including resource allocation information for HARQ burst retransmission, the increased modulation order of the $M_F$-FSK, and the reduced modulation order of the $M_Q$-QAM to the terminal 802.

At operation 822, the base station 800 retransmits a downlink HARQ burst modulated using the changed 8-FSK and 8-QAM to the terminal 802.

Thereafter, the terminal 802 determines the resource allocated for retransmission of the HARQ burst from the downlink MAP message, the changed 8-FSK and 8-QAM at operation 820, and the terminal 802 demodulates a received downlink HARQ burst using a demodulation scheme corresponding to 8-FSK and 8-QAM. The terminal 802 may combine an LLR of the initial transmission downlink HARQ burst of operation 814 with an LLR of a retransmission downlink HARQ burst of operation 822 to perform channel decoding. At this point, if the channel decoding has not been successfully performed, then at operation 824, the terminal 802 transmits an NACK message again to the base station 800.

At operation 826, the base station 800 that has received the NACK message again increases the modulation order of the $M_F$-FSK to 16, and reduces the modulation order of the $M_Q$-QAM to 4.

At operation 828, the base station 800 transmits a downlink MAP message including resource allocation information for HARQ burst second retransmission, the increased modulation order of the $M_F$-FSK, and the reduced modulation order of the $M_Q$-QAM to the terminal 802.

At operation 830, the base station 800 retransmits a downlink HARQ burst modulated using the changed 16-FSK and 4-QAM to the terminal 802.

Thereafter, the terminal 802 determines the resource allocated for second retransmission of an HARQ burst and the changed 16-FSK and 4-QAM from the downlink MAP message at operation 828, and demodulates a received downlink HARQ burst using a demodulation scheme corresponding to the 16-FSK and 4-QAM at operation 830. The terminal 802 may combine an LLR combined at operation 822 with an LLR of the second retransmission downlink HARQ burst of operation 830 to perform channel decoding.

At operation 832, if the channel decoding has been successfully performed, then the terminal 802 transmits an ACK message to the base station 800. Accordingly, a retransmission procedure of a relevant downlink HARQ burst ends.

Hereinafter, description is made on a case in which a base station and a terminal promise the modulation order of the FQAM for HARQ retransmission and a resource allocation change rule in advance between the base station and the terminal according to various embodiments of the present disclosure, and perform retransmission according to the modulation order of the FQAM and the resource allocation change rule promised in advance with reference to FIGS. 9 to 11. For convenience in description, uplink transmission in which a terminal transmits an HARQ burst to a base station is exemplarily described. However, a method described below for operating the modulation order of the FQAM and a resource according to a change rule promised in advance is equally applicable to downlink transmission in which the base station transmits an HARQ burst to the terminal.

Figure 9:
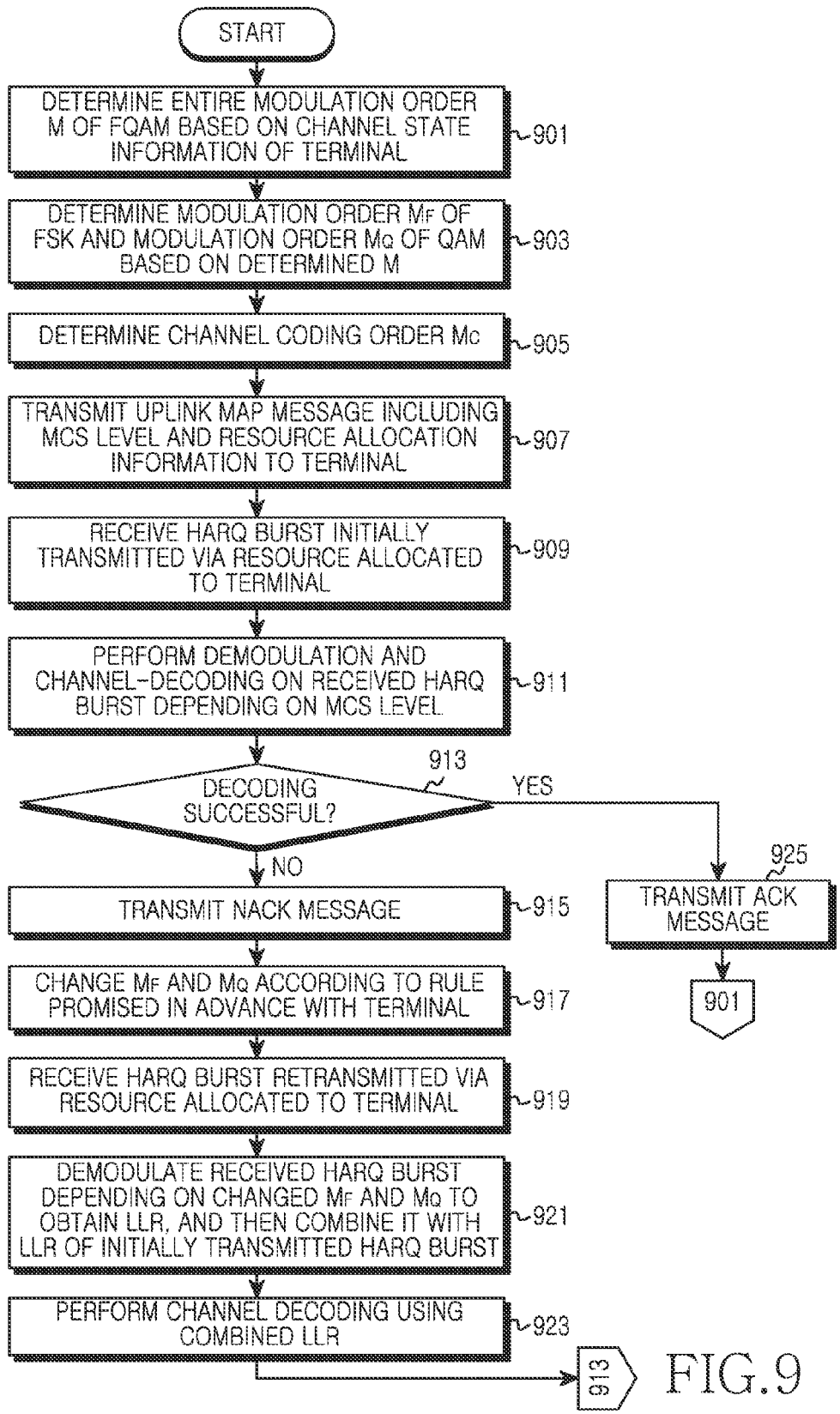
FIG. 9 is a flowchart illustrating a procedure for operating FQAM with consideration of an HARQ technique in a base station according to an embodiment of the present disclosure.

FIG. 9 is a flowchart illustrating a procedure for operating FQAM with consideration of an HARQ technique in a base station according to an embodiment of the present disclosure.

Referring to FIG. 9, description is made using a case in which a base station and a terminal promise a change rule in advance via a method of determining, at the base station, the modulation order of the FQAM and a resource allocation change rule for HARQ retransmission, and transmitting the change rule to the terminal via a MAP message before an HARQ retransmission process starts as an example. However, depending on various embodiments of the present disclosure, in the case in which the same change rule has been set to the base station and the terminal by a business, or the same change rule has been set by a method set in advance by each of the base station and the terminal, the process for transmitting and receiving information regarding the change rule between the base station and the terminal may be omitted.

Referring to FIG. 9, at operation 901, the base station determines the modulation order M of the FQAM based on channel state information of a terminal. At this point, the channel state information may include a CINR, an average CINR, a standard deviation for a CINR, an RSSI, α and β representing an interference characteristic of a CGG interference model, and a preferred MCS level.

Thereafter, at operation 903, the base station determines the modulation order $M_F$ of the $M_F$-FSK, and the modulation order $M_Q$ of the $M_Q$-QAM forming the M-FQAM based on the modulation order M of the M-FQAM. At this point, the modulation order $M_F$ and the modulation order $M_Q$ should be determined such that the product of the two values becomes the same value as the modulation order M of the FQAM. ($M=M_F \times M_Q$). At this point, under a situation in which the modulation order M of the M-FQAM is the same, the base station may determine the modulation order $M_F$ of the $M_F$-FSK and the modulation order $M_Q$ of the $M_Q$-QAM with consideration of a characteristic that power efficiency increases as the modulation order $M_F$ of the $M_F$-FSK increases, and bandwidth efficiency increases as the modulation order $M_F$ of the $M_F$-FSK decreases.

Thereafter, at operation 905, the base station determines a channel coding order $M_C$. The channel coding order $M_C$ may be determined depending on channel state information and an encoding rate of a channel code. In addition, the channel coding order $M_C$ may be determined based on the modulation order M of the M-FQAM. In contrast, if the channel coding order $M_C$ is determined in advance, then the modulation order M of the M-FQAM may be determined based on the channel coding order $M_C$. For example, the modulation order M of the M-FQAM may be determined as the same value as $M_C$ or a value corresponding to an integer multiple of $M_C$.

Thereafter, at operation 907, the base station transmits an uplink MAP message including MCS level information including at least one of M, $M_F$, $M_Q$, and $M_C$ determined in operations 901 to 905 and resource allocation information to the terminal. At this point, the uplink MAP message includes information regarding a rule for changing $M_F$ and $M_Q$ and a resource to be allocated in the case where HARQ retransmission occurs afterward.

Thereafter, at operation 909, the base station receives an uplink HARQ burst initially transmitted from the terminal via a resource allocated to the terminal.

At operation 911, the base station demodulates the received HARQ burst according to the MCS level and then performs channel decoding.

At operation 913, the base station determines whether the channel decoding is successfully performed.

If the base station determines that the channel decoding is successfully performed at operation 913, then the base station proceeds to operation 925 at which the base station transmits an ACK message to the terminal. Thereafter, the base station proceeds to operation 901.

In contrast, if the base station determines that the channel decoding is not successfully performed at operation 913, then the base station proceeds to operation 915 at which the base station transmits an NACK message to the terminal.

Thereafter, at operation 917, the base station changes the modulation order $M_F$ of the $M_F$-FSK and the modulation order $M_Q$ of the $M_Q$-QAM according to the rule promised in advance with the terminal. At this point, with the modulation order M of the M-FQAM used during initial transmission of the relevant HARQ burst maintained, the base station changes the modulation order $M_F$ of the $M_F$-FSK and the modulation order $M_Q$ of the $M_Q$-QAM.

Thereafter, at operation 919, the base station receives an uplink HARQ burst retransmitted from the terminal via a resource allocated to the terminal according to a rule promised in advance with the terminal.

Thereafter, at operation 921, the base station demodulates a retransmission HARQ burst based on the modulation orders $M_F$ and $M_Q$ changed for HARQ retransmission to obtain an LLR, and combines the obtained LLR with an LLR of the previously received relevant HARQ burst (e.g., initial transmission HARQ burst).

Thereafter, at operation 923, the base station performs channel decoding using the combined LLR.

Thereafter, the base station returns to operation 913 to re-perform subsequent steps.

Figure 10:
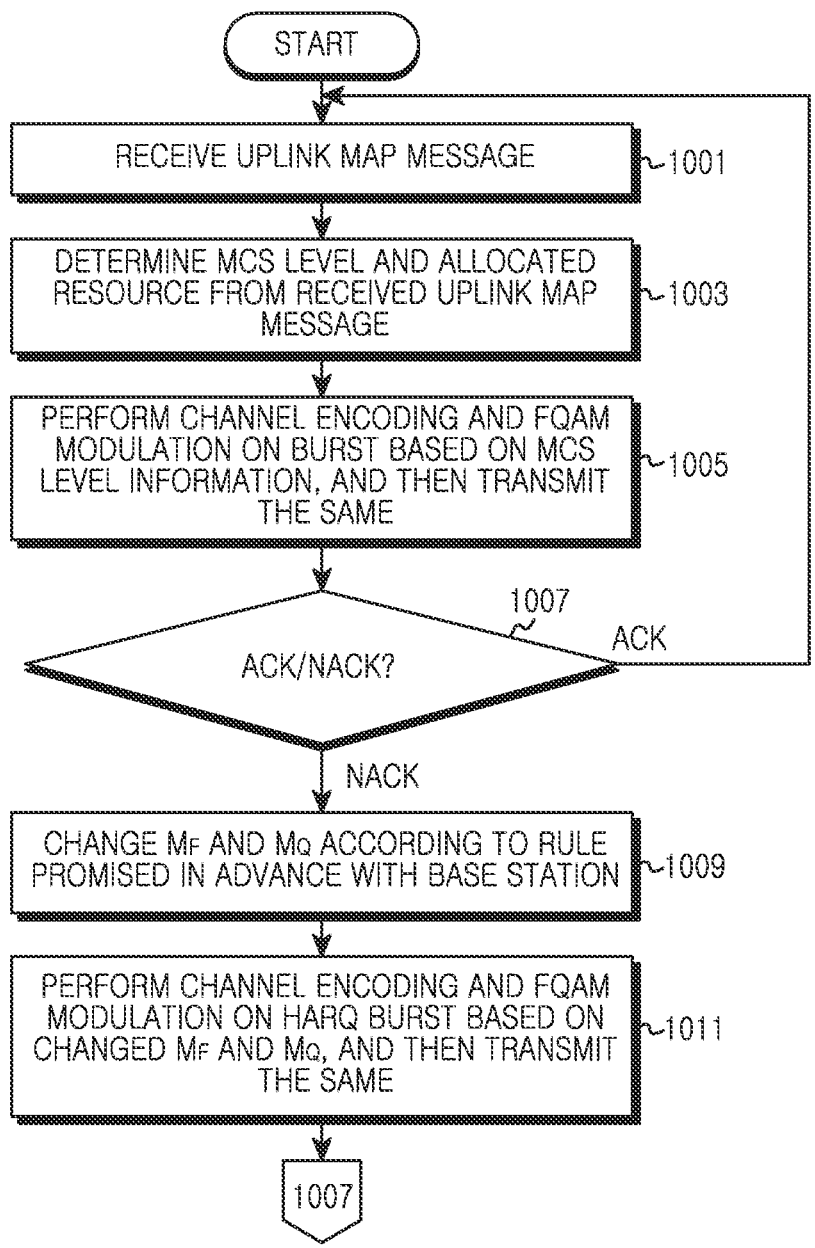
FIG. 10 is a flowchart illustrating a procedure for operating FQAM with consideration of an HARQ technique in a terminal according to an embodiment of the present disclosure.

FIG. 10 is a flowchart illustrating a procedure for operating FQAM with consideration of an HARQ technique in a terminal according to an embodiment of the present disclosure.

Referring to FIG. 10, description is made using a case in which a base station and a terminal promise a change rule in advance via a method by which the terminal receives the change rule from the base station via a MAP message before an HARQ retransmission process starts. However, according to various embodiments of the present disclosure, in the case in which the same change rule has been set to the base station and the terminal by a business, or the same change rule has been set by a method set in advance by each of the base station and the terminal, the process for transmitting and receiving information regarding the change rule between the base station and the terminal may be omitted.

Referring to FIG. 10, at operation 1001, the terminal receives an uplink MAP message.

At operation 1003, the terminal determines an MCS level and an allocated resource from the uplink MAP message. The MCS level includes at least one of M, $M_F$, $M_Q$, and $M_C$ determined by the base station. In addition, the terminal obtains information regarding a rule for changing $M_F$ and $M_Q$ and a resource to be allocated in the case in which HARQ retransmission occurs afterward.

Thereafter, at operation 1005, the terminal performs channel encoding and FQAM modulation on the HARQ burst based on the MCS level information, and transmits the same to the base station.

Thereafter, at operation 1007, the terminal determines whether an ACK message or an NACK message is received from the base station.

If the terminal determines that an ACK message is received at operation 1007, then the terminal determines that the relevant HARQ burst has been successfully transmitted and returns to operation 1001 at which the terminal re-performs subsequent steps, or performs channel encoding and FQAM modulation on the next HARQ burst and then transmit the same at operation 1005.

In contrast, if the terminal determines that an NACK message is received at operation 1007, then the terminal determines that the transmission of the relevant HARQ burst has failed, and the terminal proceeds to operation 1009 at which the terminal changes $M_F$ and $M_Q$ according to the rule promised in advance with the base station for retransmission of the relevant HARQ burst, that is, the rule obtained from the uplink MAP message. Of course, at this point, the terminal may determine the position and size of a resource via which the relevant HARQ burst will be retransmitted using the resource allocation change information obtained in advance from the uplink MAP message.

Thereafter, at operation 1011, the terminal performs channel encoding and FQAM modulation on the relevant HARQ burst based on the changed $M_F$ and $M_Q$ and then transmits the same to the base station.

Thereafter, the terminal returns to operation 1007 at which the terminal pre-performs subsequent steps.

Figure 11:
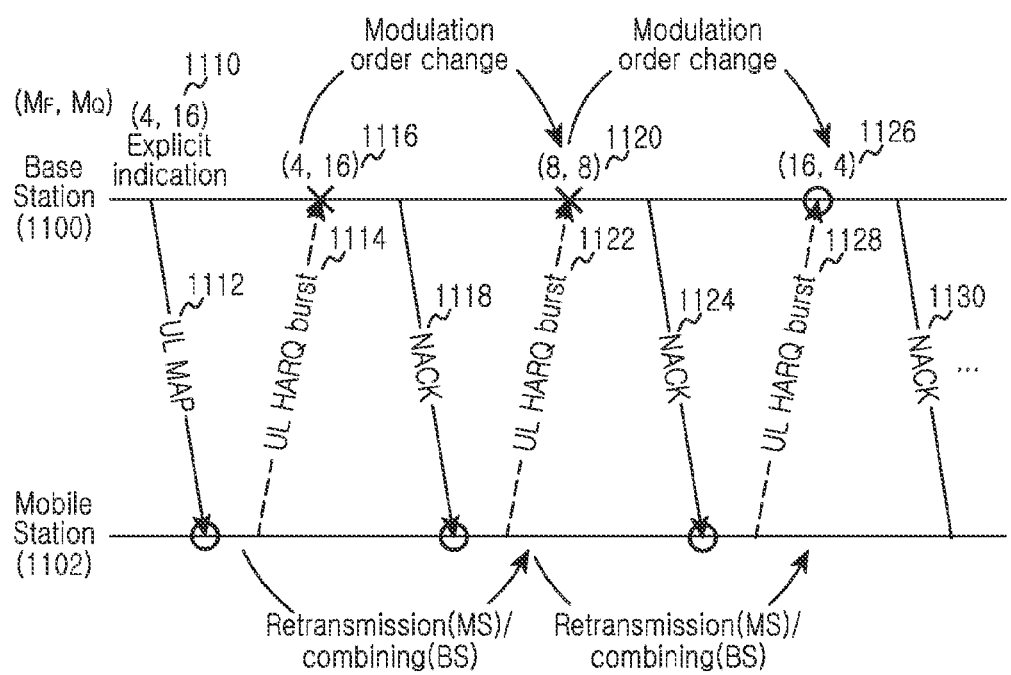
FIG. 11 is a view illustrating an example of operating FQAM in an HARQ system according to an embodiment of the present disclosure.

FIG. 11 is a view illustrating an example of operating FQAM in an HARQ system according to an embodiment of the present disclosure.

Referring to FIG. 11, for convenience in description, description is made on the assumption that the modulation order M of the M-FQAM has been determined as 64.

As illustrated in FIG. 11, according to various embodiments of the present disclosure, at operation 1110, a base station 1100 determines the modulation order of the $M_F$-FSK as 4 and the modulation order of the $M_Q$-QAM as 16 with consideration of channel state information.

Thereafter, at operation 1112, the base station 1100 transmits an uplink MAP message including resource allocation information, the modulation order of the $M_F$-FSK, and the modulation order of the $M_Q$-QAM for the terminal 1102 to the terminal 1102. At this point, according to various embodiments of the present disclosure, the uplink MAP message includes information regarding a rule for changing $M_F$ and $M_Q$ and a resource to be allocated in the case in which HARQ retransmission occurs afterward.

Thereafter, the terminal 1102 determines the resource allocated by the base station 1100 and the modulation orders of FSK and QAM forming FQAM have been determined as 4 and 16, respectively, from the uplink MAP message at operation 1112, and at operation 1114, the terminal 1102 transmits an uplink HARQ burst modulated using 4-FSK and 16-QAM to the base station 1100.

Thereafter, the base station 1100 receives the uplink HARQ burst at operation 1114, and at operation 1116, the base station 1100 demodulates the received uplink HARQ burst using a demodulation scheme corresponding to 4-FSK and 16-QAM to determine whether decoding is successful.

If the uplink HARQ burst has not been successfully decoded, the base station 1100 proceeds to operation 1118 at which the base station 1100 transmits an NACK message to the terminal 1102, and increases the modulation order of the $M_F$-FSK to 8 and reduces the modulation order of the $M_Q$-QAM to 8 based on information regarding the $M_F$ and $M_Q$ change rule and the resource to be allocated, transmitted to the terminal via the uplink MAP message. At operation 1120, the base station 1100 determines a resource of an uplink HARQ burst to be retransmitted.

At this point, the terminal 1102 that has received an NACK message increases the modulation order of the $M_F$-FSK to 8 and reduces the modulation order of the $M_Q$-QAM to 8, and determines a resource of an uplink HARQ burst to be retransmitted, based on information regarding the $M_F$ and $M_Q$ change rule and the resource to be allocated, received in advance via the uplink MAP message. Thereafter, at operation 1122, the terminal 1102 retransmits the uplink HARQ burst modulated using the changed 8-FSK and 8-QAM via the determined resource to the base station 1100.

Then, at operation 1120, the base station 1100 receives the retransmitted uplink HARQ burst in operation 1122, and demodulates the uplink HARQ burst using a demodulation scheme corresponding to 8-FSK and 8-QAM changed in advance to determine whether decoding is successful. If the uplink HARQ burst has not been successfully decoded, then, at operation 1124, the base station 1100 transmits an NACK message to the terminal 1102, and increases the modulation order of the $M_F$-FSK to 16 and reduces the modulation order of the $M_Q$-QAM to 4.

At operation 1126, the base station 1100 determines a resource of an uplink HARQ burst to be retransmitted based on information regarding the $M_F$ and $M_Q$ change rule and the resource to be allocated, transmitted in advance to the terminal via the uplink MAP message.

At this point, the terminal 1102 that has received again an NACK message increases the modulation order of the $M_F$-FSK to 16 and reduces the modulation order of the $M_Q$-QAM to 4, and determines a resource of a second retransmission uplink HARQ burst based on information regarding the $M_F$ and $M_Q$ change rule and the resource to be allocated, received in advance via the uplink MAP message. Thereafter, at operation 1128, the terminal 1102 retransmits an uplink HARQ burst modulated using changed 16-FSK and 4-QAM to the base station 1100 via the determined resource.

Thereafter, the base station 1100 receives the retransmitted uplink HARQ burst in operation 1128, and demodulates the uplink HARQ burst using a demodulation scheme corresponding to 16-FSK and 4-QAM changed at operation 1126 to determine whether decoding is successful. When the uplink HARQ burst has been successfully decoded, the base station 1100 transmits an ACK message to the terminal 1102. Accordingly, the HARQ retransmission procedure for the relevant uplink HARQ burst ends.

The various embodiments of the present disclosure have an effect of improving performance of HARQ and FQAM expected for a given bit size per modulation symbol, and improving spectral efficiency of users positioned on a cell edge by combining bandwidth-efficient QAM and power-efficient FSK to operate FQAM, and adaptively changing the modulation order of QAM and the modulation order of FSK when operating FQAM.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Operations according to various embodiment of the present disclosure may be implemented by a single controller. In this case, a program instruction for performing an operation implemented by various computers may be recorded on a computer-readable medium. The non-transitory computer-readable medium may include a program instruction, a data file, a data structure, and the like in a single form or a combination form. The program instruction may be things specially designed for the present disclosure, or things known to a person of ordinary skill in the art and available. An example of the non-transitory computer-readable medium includes a hardware device specially configured for storing and performing a program, such as a hard disk, a magnetic medium like a floppy disk and a magnetic tape, an optical recording medium like a CD-ROM or a DVD, a magnetic-optical medium like a floptical disk, ROM, RAM, a flash memory, and the like. An example of a program instruction includes not only a machine language code generated by a compiler but also a high-level code executable on a computer using an interpreter, the like. In the case where all or a portion of a base station or a relay described in the present disclosure is implemented in the form of a computer program, a non-transitory computer-readable recording medium storing the computer program is also included in the present disclosure. Therefore, the scope of the present disclosure should not be limited to the described embodiments but should be determined by not only appended claims but also equivalents thereof.

What is claimed is:

1. A method of a transmission end supporting a hybrid modulation technique in which different types of modulation schemes are mixed, the method comprising:

acquiring channel state information between the transmission end and a reception end;

determining a first modulation order of a first modulation scheme and a second modulation order of a second modulation scheme based on the channel state information; and modulating consecutive bits based on a first modulator corresponding to the first modulation order and the first modulation scheme, and a second modulator corresponding to the second modulation order and the second modulation scheme, wherein the first modulation scheme and the second modulation scheme form the hybrid modulation technique.

2. The method of claim 1, wherein the hybrid modulation technique is a modulation technique in which a Frequency Shift Keying (FSK) modulation scheme and a Quadrature Amplitude Modulation (QAM) modulation scheme are mixed.

3. The method of claim 1, wherein the determining of the first modulation order of the first modulation scheme and the second modulation order of the second modulation scheme comprises:

determining an entire modulation order of the hybrid modulation technique among a value same as and values corresponding to integer multiples of an order of a coding technique of the transmission end based on the channel state information; and determining the first modulation order of the first modulation scheme and the second modulation order of the second modulation scheme based on the entire modulation order and the channel state information, and wherein a product of the first modulation order of the first modulation scheme and the second modulation order of the second modulation scheme is the same value as the entire modulation order.

4. The method of claim 3, wherein the determining of the entire modulation order of the hybrid modulation technique based on the channel state information comprises:

in case of supporting an adaptive Hybrid Automatic Repeat reQuest (HARQ), determining whether a relevant burst is an initial transmission burst or a retransmission burst using a received ACK/NACK message;

when the relevant burst is determined to be the initial transmission burst, adaptively changing the entire modulation order of the hybrid modulation technique; and when the relevant burst is determined to be the retransmission burst, maintaining the same entire modulation order of the hybrid modulation technique as the entire modulation order of the hybrid modulation technique used for the initial transmission burst, and when the relevant burst is determined to be the retransmission burst, the first modulation order of the first modulation scheme and the second modulation order of the second modulation scheme are changed within a range maintaining the same entire modulation order of the hybrid modulation technique as the entire modulation order of the hybrid modulation technique used for the initial transmission burst.

5. The method of claim 3, further comprising:

when, the transmission end is a base station, transmitting at least one of the entire modulation order of the hybrid modulation technique, the first modulation order of the first modulation scheme, the second modulation order of the second modulation scheme, and a modulation order change rule to the reception end via an allocation information message.

6. The method of claim 3, further comprising:
when, the transmission end is a terminal, determining at least one of the entire modulation order of the hybrid modulation technique, the first modulation order of the first modulation scheme, and the second modulation order of the second modulation scheme based on one of an allocation information message received from the reception end and a modulation order rule promised in advance with the reception end.

7. An apparatus of a transmission end supporting a hybrid modulation technique in which different types of modulation schemes are mixed, the apparatus comprising:
a hybrid modulator configured to combine a first modulator of first modulation scheme and a second modulator of a second modulation scheme; and
a scheduler configured to acquire information of a channel state between the transmission end and a reception end, and to determine a first modulation order of the first modulation scheme and a second modulation order of the second modulation scheme depending on the channel state information, modulating consecutive bits based on the first modulator corresponding to the first modulation order and the first modulation scheme, and the second modulator corresponding to the second modulation order and the second modulation scheme.

8. The apparatus of claim 7, wherein the hybrid modulator is a modulator where a Frequency Shift Keying (FSK) modulation scheme and a Quadrature Amplitude Modulation (QAM) modulation scheme are mixed.

9. The apparatus of claim 7, wherein the scheduler determines an entire modulation order of the hybrid modulation technique among a value same as and values corresponding to integer multiples of an order of a coding technique of the transmission end based on the channel state information, and determines the first modulation order of the first modulation scheme and the second modulation order of the second modulation scheme based on the entire modulation order and the channel state information, and
wherein a product of the first modulation order of the first modulation scheme and the second modulation order of the second modulation scheme is the same value as the entire modulation order.

10. The apparatus of claim 9, wherein in case of supporting an adaptive Hybrid Automatic Repeat reQuest (HARQ), the scheduler determines whether a relevant burst is an initial transmission burst or a retransmission burst using a received ACK/NACK message,
when the relevant burst is determined to be the initial transmission burst, the scheduler adaptively changes the entire modulation order of the hybrid modulation technique, and
when the relevant burst is determined to be the retransmission burst, the scheduler changes the first modulation order of the first modulation scheme and the second modulation order of the second modulation scheme within a range maintaining the same entire modulation order of the hybrid modulation technique as the entire modulation order of the hybrid modulation technique used for the initial transmission burst.

11. The apparatus of claim 9, further comprising:
a communication module configured to transmit/receive a signal to/from the reception end,
wherein, when the transmission end is a base station, the scheduler controls a function for transmitting at least one of the entire modulation order of the hybrid modulation technique, the first modulation order of the first modulation scheme, the second modulation order of the second modulation scheme, and a modulation order change rule to the reception end via an allocation information message.

12. The apparatus of claim 9, further comprising:
a communication module configured to transmit/receive a signal to/from the reception end,
wherein, when the transmission end is a terminal, the scheduler determines at least one of the entire modulation order of the hybrid modulation technique, the first modulation order of the first modulation scheme, and the second modulation order of the second modulation scheme based on one of an allocation information message received from the reception end and a modulation order rule promised in advance with the reception end.

* * * * *